US012038608B2

(12) United States Patent
Bandyopadhyay et al.

(10) Patent No.: US 12,038,608 B2
(45) Date of Patent: Jul. 16, 2024

(54) SELF-ALIGNING PHOTONIC INTERCONNECTIONS FOR PHOTONIC INTEGRATED CIRCUITS

(71) Applicant: Massachusetts Institute of Technology, Cambridge, MA (US)

(72) Inventors: Saumil Bandyopadhyay, Cambridge, MA (US); Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 335 days.

(21) Appl. No.: 17/470,803

(22) Filed: Sep. 9, 2021

(65) Prior Publication Data
US 2022/0146749 A1 May 12, 2022

Related U.S. Application Data

(60) Provisional application No. 63/111,232, filed on Nov. 9, 2020.

(51) Int. Cl.
*G02B 6/125* (2006.01)
*G02B 6/12* (2006.01)

(52) U.S. Cl.
CPC .... *G02B 6/125* (2013.01); *G02B 2006/12147* (2013.01)

(58) Field of Classification Search
None
See application file for complete search history.

(56) References Cited

U.S. PATENT DOCUMENTS

| 8,948,555 B1* | 2/2015 | Roth | G02B 6/12002 |
| | | | 385/27 |
| 2017/0139142 A1* | 5/2017 | Patel | G02B 6/12004 |
| (Continued) | | | |

OTHER PUBLICATIONS

Almeida et al. "Nanotaper for compact mode conversion." Optics Letters 28.15 (2003): 1302-1304.
(Continued)

*Primary Examiner* — Chad H Smith
(74) *Attorney, Agent, or Firm* — Smith Baluch LLP

(57) ABSTRACT

The next-generation of optoelectronic systems will require efficient optical signal transfer between many discrete photonic components integrated onto a single substrate. While modern assembly processes can easily integrate thousands of electrical components onto a single board, photonic assembly is far more challenging due to the wavelength-scale alignment tolerances required. Here we address this problem by introducing a self-aligning photonic coupler insensitive to x, y, z displacement and angular misalignment. The self-aligning coupler provides a translationally invariant evanescent interaction between waveguides by intersecting them at an angle, which enables a lateral and angular alignment tolerance fundamentally larger than non-evanescent approaches such as edge coupling. This technology can function as a universal photonic connector interfacing photonic integrated circuits and microchiplets across different platforms. For example, it can be used in a self-aligning photonic circuit board that can be assembled more easily, with larger misalignment tolerances, than other complex optoelectronic systems.

20 Claims, 19 Drawing Sheets

(56) References Cited

U.S. PATENT DOCUMENTS

| | | | | |
|---|---|---|---|---|
| 2017/0343734 A1* | 11/2017 | Collins | ............ | G02B 6/12002 |
| 2018/0172905 A1* | 6/2018 | Fortusini | ............ | G02B 6/4214 |
| 2020/0225401 A1 | 7/2020 | Yu et al. | | |

OTHER PUBLICATIONS

Atature et al. "Material platforms for spin-based photonic quantum technologies." Nature Reviews Materials 3.5 (2018): 38-51.

Awschalom et al. "Quantum technologies with optically interfaced solid-state spins." Nature Photonics 12.9 (2018): 516-527.

Barwicz et al., "Automated, high-throughput photonic packaging." Optical Fiber Technology 44 (2018): 24-35.

Bernabé et al., "Chip-to-chip optical interconnections between stacked self-aligned SOI photonic chips." Optics Express 20.7 (2012): 7886-7894.

Bhaskar et al. "Experimental demonstration of memory-enhanced quantum communication." arXiv preprint arXiv:1909.01323 (2019), 15 pages.

Billah et al., "Hybrid integration of silicon photonics circuits and InP lasers by photonic wire bonding." Optica 5.7 (2018): 876-883.

Bradley et al. "A ten-qubit solid-state spin register with quantum memory up to one minute." Physical Review X 9.3 (2019): 031045, 12 pages.

Choi et al. "Percolation-based architecture for cluster state creation using photon-mediated entanglement between atomic memories." npj Quantum Information 5.1 (2019): 1-7.

Dangel et al., "Polymer waveguides enabling scalable low-loss adiabatic optical coupling for silicon photonics." IEEE Journal of Selected Topics in Quantum Electronics 24.4 (2018): 1-11.

Gordillo et al., "Plug-and-play fiber to waveguide connector." Optics Express 27.15 (2019): 20305-20310.

Harris et al., "Linear programmable nanophotonic processors." Optica 5.12 (2018): 1623-1631.

Humphreys et al. "Deterministic delivery of remote entanglement on a quantum network." Nature 558.7709 (2018): 268-273.

Lin et al., "Low-cost board-to-board optical interconnects using molded polymer waveguide with 45 degree mirrors and inkjet-printed micro-lenses as proximity vertical coupler." Optics Express 21.1 (2013): 60-69.

Lindenmann et al., "Connecting silicon photonic circuits to multicore fibers by photonic wire bonding." Journal of lightwave Technology 33.4 (2015): 755-760.

Lindenmann et al., "Photonic wire bonding: a novel concept for chip-scale interconnects." Optics Express 20.16 (2012): 17667-17677.

Mangal et al., "Ball lens embedded through-package via to enable backside coupling between silicon photonics interposer and board-level interconnects." Journal of Lightwave Technology 38.8 (2020): 2360-2369.

Monroe et al. "Large-scale modular quantum-computer architecture with atomic memory and photonic interconnects." Physical Review A 89.2 (2014): 022317, 16 pages.

Muralidharan et al. "Optimal architectures for long distance quantum communication," Scientific Reports (2016): 20463, 10 pages.

Nemoto et al. "Photonic architecture for scalable quantum information processing in diamond." Physical Review X 4.3 (2014): 031022, 12 pages.

Nickerson et al. "Freely scalable quantum technologies using cells of 5-to-50 qubits with very lossy and noisy photonic links." Physical Review X 4.4 (2014): 041041, 17 pages.

Ogunsola et al., "Chip-level waveguide-mirror-pillar optical interconnect structure." IEEE Photonics Technology Letters 18.15 (2006): 1672-1674.

Pernice et al. "Second harmonic generation in phase matched aluminum nitride waveguides and micro-ring resonators." Applied Physics Letters 100.22 (2012): 223501, 5 pages.

Piparo et al. "Quantum multiplexing." Physical Review A 99.2 (2019): 022337, 11 pages.

Snyder et al., "Hybrid integration of the wavelength-tunable laser with a silicon photonic integrated circuit." Journal of Lightwave Technology 31.24 (2013): 3934-3942.

Soganci et al., "Flip-chip optical couplers with scalable I/O count for silicon photonics." Optics Express 21.13 (2013): 16075-16085.

Taillaert et al. "An out-of-plane grating coupler for efficient butt-coupling between compact planar waveguides and single-mode fibers." IEEE Journal of Quantum Electronics 38.7 (2002): 949-955.

Waldhausl et al. "Efficient coupling into polymer waveguides by gratings." Applied Optics 36.36 (1997): 9383-9390.

Wan et al. "Large-scale integration of near-indistinguishable artificial atoms in hybrid photonic circuits." arXiv preprint arXiv:1911.05265 (2019), 11 pages.

Wan et al., "Large-scale integration of artificial atoms in hybrid photonic circuits." Nature 583.7815 (2020): 226-231.

Wang et al., "Multidimensional quantum entanglement with large-scale integrated optics." Science 360.6386 (2018): 285-291.

Wehner et al. "Quantum internet: A vision for the road ahead." Science 362.6412 (2018): eaam9288, 11 pages.

Werquin et al. "Ring resonators with vertically coupling grating for densely multiplexed applications." IEEE Photonics Technology Letters 27.1 (2014): 97-100.

Yu et al., "Optical free-form couplers for high-density integrated photonics (OFFCHIP): A universal optical interface." Journal of Lightwave Technology 38.13 (2020): 3358-3365.

Zuo et al., "Low loss, flexible single-mode polymer photonics." Optics Express 27.8 (2019): 11152-11159.

\* cited by examiner

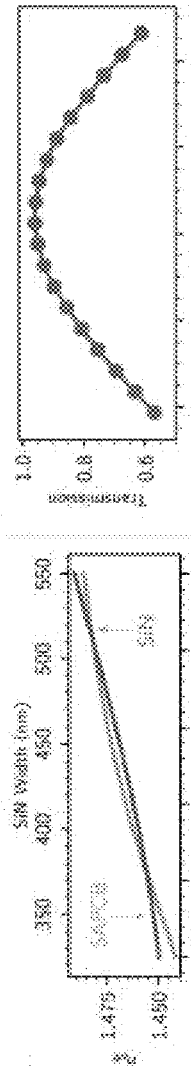
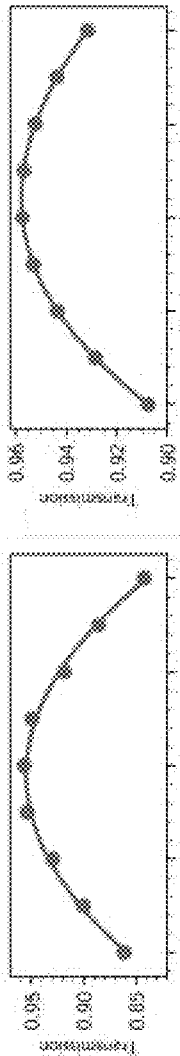
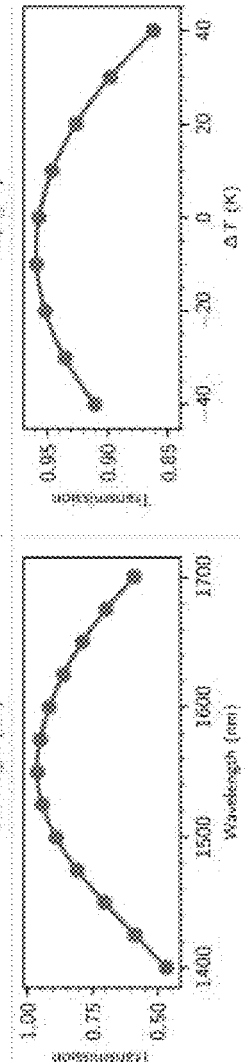
FIG. 3A  FIG. 3B  FIG. 3C  FIG. 3D  FIG. 3E  FIG. 3F

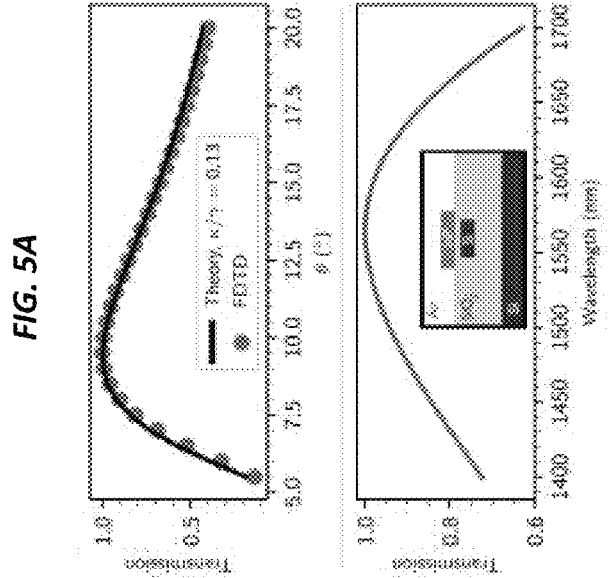
FIG. 5A
FIG. 5B
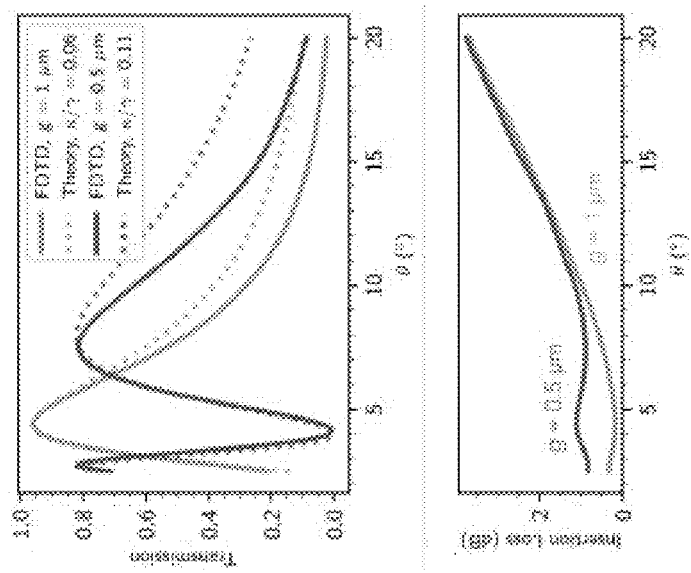
FIG. 4A
FIG. 4B (b) Lithography by SU-8 interference lithography either on low-index substrate with optional back-fill if necessary

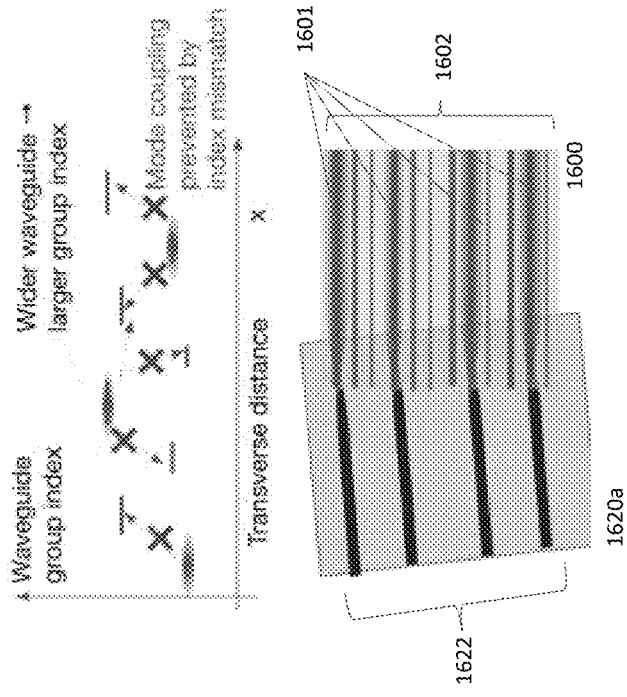
FIG. 16B
FIG. 16D
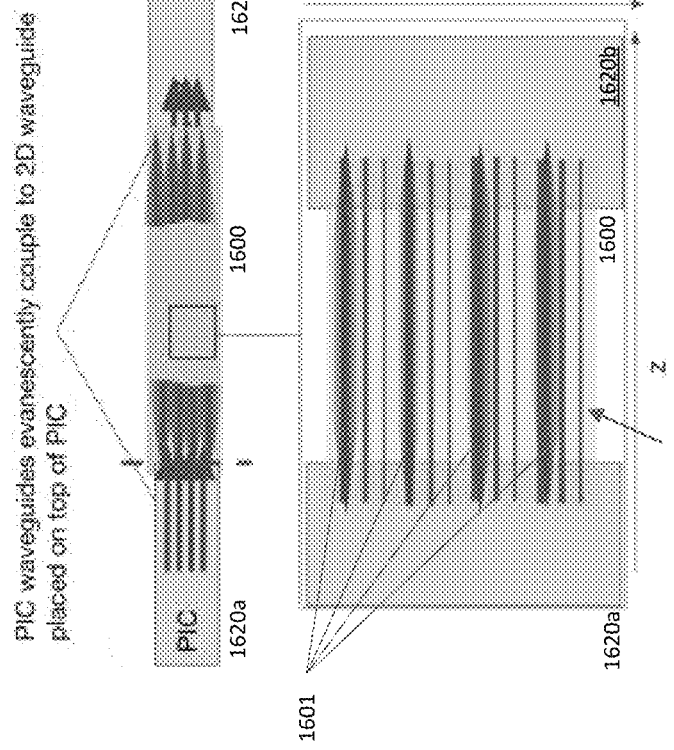
FIG. 16A
FIG. 16C

SELF-ALIGNING PHOTONIC INTERCONNECTIONS FOR PHOTONIC INTEGRATED CIRCUITS

CROSS-REFERENCE TO RELATED APPLICATION(S)

This application claims the priority benefit, under 35 U.S.C. 119(e), of U.S. Application No. 63/111,232, which was filed on Nov. 9, 2020, and is incorporated herein by reference in its entirety.

GOVERNMENT SUPPORT

This invention was made with government support under CNS1946976 awarded by the National Science Foundation, and FA9550-16-1-0391 awarded by the Air Force Office of Scientific Research. The government has certain rights in the invention.

BACKGROUND

Interconnects are indispensable in electronics, enabling circuit components with diverse functionalities to be assembled together into complex systems. The same need for system integration exists in optics, but an outstanding challenge is to develop alignment-tolerant optical interconnects for systems comprising multiple photonic components.

An optical interconnect should be single-mode, low loss, easy to manufacture, and compatible with high-density electrical interconnect technologies such as flip-chip bonding. Typically, this is achieved using tapered adiabatic couplers that interface waveguides on a photonic integrated circuit (PIC) to a common optical substrate. However, alternative approaches have been proposed in the past, including photonic "wirebonds" that connect PICs through flexible polymer waveguides, integrated optical microlenses with through-substrate vertical grating couplers, and bulk optical components such as parabolic reflectors microfabricated into polymer films. Small numbers of PICs can also be connected by conventional fiber with edge coupling or grating coupling, but this is challenging to scale to large numbers of channels.

All of these technologies require alignment that is orders of magnitude more demanding in angle and displacement than for electrical contacts, making assembly challenging and systems susceptible to environmental fluctuations. While electronic assembly usually involves placement accuracies of tens of microns, optical coupling typically involves optical wavelength-scale alignment. This disparity in tolerances presents a roadblock to scaling photonic systems.

SUMMARY

A self-aligning photonic interconnect technology that is insensitive to misalignment can be used to connect PICs and other devices with photonic components. This technology uses the interaction created by two waveguides crossing at an angle, giving rise to efficient evanescent coupling at their intersection. Importantly, this coupler is invariant to translational misalignment, as two waveguides at an angle will still intersect after in-plane translation. Surprisingly, in addition to translational invariance, the coupling efficiency of this structure is far more insensitive to angular misalignment than more conventional approaches such as edge coupling. A cantilevered self-aligning coupler also relaxes tolerances for out-of-plane misalignment.

In addition to having large translational and angular misalignment tolerances, an inventive self-aligning photonic interconnect has several advantages over other PIC connectors. It can connect a single-mode waveguide on one PIC to a single-mode waveguide in the same PIC or another PIC. Its propagation loss can be extremely low, e.g., below 0.1 dB/cm. Its insertion loss can be less than 0.1 dB/facet. It can transmit almost arbitrarily many beams between two chips, without the need for single-mode waveguides or fibers—one self-aligning photonic interconnect can connect PICs with arbitrary waveguide pitches. It can be flexible and pliable and thus can conform to the surface of a PIC. A self-aligning photonic interconnect can be made using low-cost manufacturing techniques. And many two-dimensional (2D) self-aligning photonic interconnect can be layered or stacked on top of each other and molded together to enable 3D interconnect geometries.

Self-aligning couplers can be realized in a system with first and second devices (e.g., PICs, microchiplets, and photonic circuit boards). In such system, the first device includes a first waveguide that guides light in a first direction in a first plane. The second device is in contact with the first device and includes a second waveguide with a coupling section that guides light in a second direction in a second plane parallel to the first plane. This second direction forms an angle of θ with the first direction about an axis perpendicular to first plane and the second plane. The coupling section also overlaps the first waveguide (e.g., across a gap of about 0.5 μm to about 2.0 μm) such that at least a portion of the light couples evanescently between the first waveguide and the second waveguide.

The first waveguide can be in a first waveguide array having a first pitch and the second waveguide can be in a second waveguide array having a second pitch different than the first pitch. The second waveguide array can comprise single-mode waveguides having different widths. The second pitch can be less than L sin θ, where L is a length of the coupling section of the second waveguide. The coupling efficiency between the first and second waveguides is invariant to longitudinal displacement of the second waveguide with respect to the first waveguide, to transverse displacement of the second waveguide with respect to the first waveguide less than L sin θ, and to angular misalignment about the axis perpendicular to the first plane and the second plane over a range of about 2° to about 15°.

The first waveguide can be formed in a polymer layer that is disposed on a printed circuit board and that defines at least one hole for an electrical contact between the printed circuit board and the second device. The first waveguide can also be formed in or on a cantilever that is released from a substrate and pushes against a surface of the second device to align the coupling section of the second waveguide to the first waveguide along the axis perpendicular to first plane and the second plane.

For example, such a system may include a photonic circuit board comprising an array of linear polymer waveguides that are formed in a polymer layer on a printed circuit board and configured to guide light in a first direction. It may also include a PIC that is disposed on the photonic circuit board and includes a waveguide that crosses one of the linear polymer waveguides at an angle of about 2° and about 30° in a plane parallel to the polymer layer and at a distance of about 0.5 μm to about 2.0 μm from the linear polymer waveguide. The waveguide can be on a cantilever that is released from a substrate and pushes against a surface of the polymer layer to align the waveguide to the linear polymer waveguide in a direction roughly perpendicular to polymer layer.

Other types of inventive self-aligning couplers include universal-pitch self-aligning photonic interconnects couplers (USPICs). A USPIC can be implemented with a first waveguide formed in a first PIC and a planar focusing element disposed on the first PIC, evanescently coupled to the first waveguide, and configured to image an output of the first waveguide to an input of a second waveguide. The second waveguide can be formed in the first PIC or in a second PIC.

The planar focusing element can be thermally molded onto the first PIC. It can include a pair of cladding layers and a planar waveguide core layer disposed between the pair of planar cladding layers and having a parabolic edge and a straight edge opposite the parabolic edge.

If the first waveguide is in an array of N waveguides, then the planar focusing element can have an angular alignment tolerance about an axis normal to a plane of the planar focusing element of $\Delta\theta < 1/\sqrt{N}$. The first waveguide can be tapered down to a width at which the waveguide mode has the same group index as the planar reflector over half a coupling period between the first waveguide and the planar parabolic reflector.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 3A is a plot of the effective mode indices as a function of the PIC (SiN) waveguide width and the polymer waveguide width for an example implementation. The two waveguide geometries should be engineered such that their modes have equal propagation constants.

FIG. 3B is a plot of power transfer efficiency as a function of the PIC waveguide width.

FIG. 3C is a plot of power transfer efficiency as a function of the PIC waveguide height.

FIG. 3D is a plot of power transfer efficiency as a function of the coupling gap between the PIC and polymer waveguides.

FIG. 3E is a plot of power transfer efficiency as a function of the wavelength.

FIG. 3F is a plot of power transfer efficiency as a function of the waveguide temperature.

FIG. 4A is a plot of power transfer efficiency $\eta$ versus angle $\theta$ for self-aligning coupler with coupling gaps of g=1 μm and g=0.5 μm. The solid lines indicate FDTD simulation results, while the dotted lines are fit to an analytical expression for the power transfer efficiency.

FIG. 4B is a plot of insertion loss $(|a_{out}|^2+|A_{out}|^2)/|a_{in}|^2$ as a function of $\theta$ for a self-aligning coupler. At large angles, there is significant radiation loss in addition to inefficient coupling due to the non-adiabatic nature of the intersection between the waveguides in the self-aligning coupler.

FIG. 5A is a plot of transmission vs. $\theta$ for a self-aligning coupler designed to interface a 640×300 nm InP gain microchiplet to a 500 nm×220 nm silicon photonic waveguide. The strong mode confinement in both materials eliminates scattering loss at the intersection, permitting mode transfer with no insertion loss. As a result, the transmission characteristic reproduces nearly perfectly with the theory.

FIG. 5B is a plot of transmission efficiency as a function of wavelength for the self-aligning coupler of FIG. 5A. This self-aligning coupler has a 1-dB bandwidth exceeding 230 nm.

FIG. 16A shows PIC waveguides evanescently coupled to a 2D waveguide placed on top of PIC via adiabatic coupling, with no alignment needed.

FIG. 16B shows how unwanted mode coupling can be suppressed between adjacent overlapped waveguides by introducing an intentional mismatch in group index.

FIG. 16C shows closely spaced polymer waveguides with varying widths to prevent cross-coupling by lack of phase matching. These polymer waveguides couple to PIC elevator couplers because those are adiabatic.

FIG. 16D shows PIC waveguides coupling into arbitrary waveguides at the point where the group index in the tapering PIC waveguide matches the index of one of the overlapping USPIC waveguides. A group index mismatch prevents that tapering PIC waveguide from coupling to other nearby USPIC waveguides.

DETAILED DESCRIPTION

A self-aligning photonic circuit board (SAPCB) can serve as a universal connector for optoelectronic system integration. An SAPCB unifies photonic integrated circuits, microchiplets, and electronics onto a single optoelectronic substrate. Similar to other optical PCBs (OPCBs), an SAPCB's waveguides can be made of polymer, making them easy and scalable to fabricate. However, unlike other OPCBs, which typically require defining complex waveguide routing in polymer to carry signals between components, the SAPCB can include only linear arrays of waveguides, making it far easier to manufacture. By fabricating an array of waveguides with variable widths, one can create a universal connector to match PIC waveguides of varying materials or dimensions, thereby facilitating the assembly of diverse photonic and electronic components into high-density systems.

The SAPCB also includes or makes use of bent or self-aligning couplers that align the linear polymer waveguides to waveguides in the photonic components that populate the SAPCB, to other SAPCBs, and/or other waveguides. The self-aligning couplers provide a laterally invariant system agnostic to the exact location of waveguides on the photonics and exhibits high angular tolerance and arbitrarily high lateral tolerance. A self-aligning coupler can be designed to be robust to fabrication variation larger than current-day process tolerances, and its combined lateral and angular tolerance exceeds conventional optical coupling. The SAPCB allows for system integration with minimal design and alignment requirements, allowing for a diverse set of photonic components to interface with each other and potentially permitting standardization of photonic components.

An Example Self-Aligning Photonic Circuit Board (SAPCB)

Figure 1A:
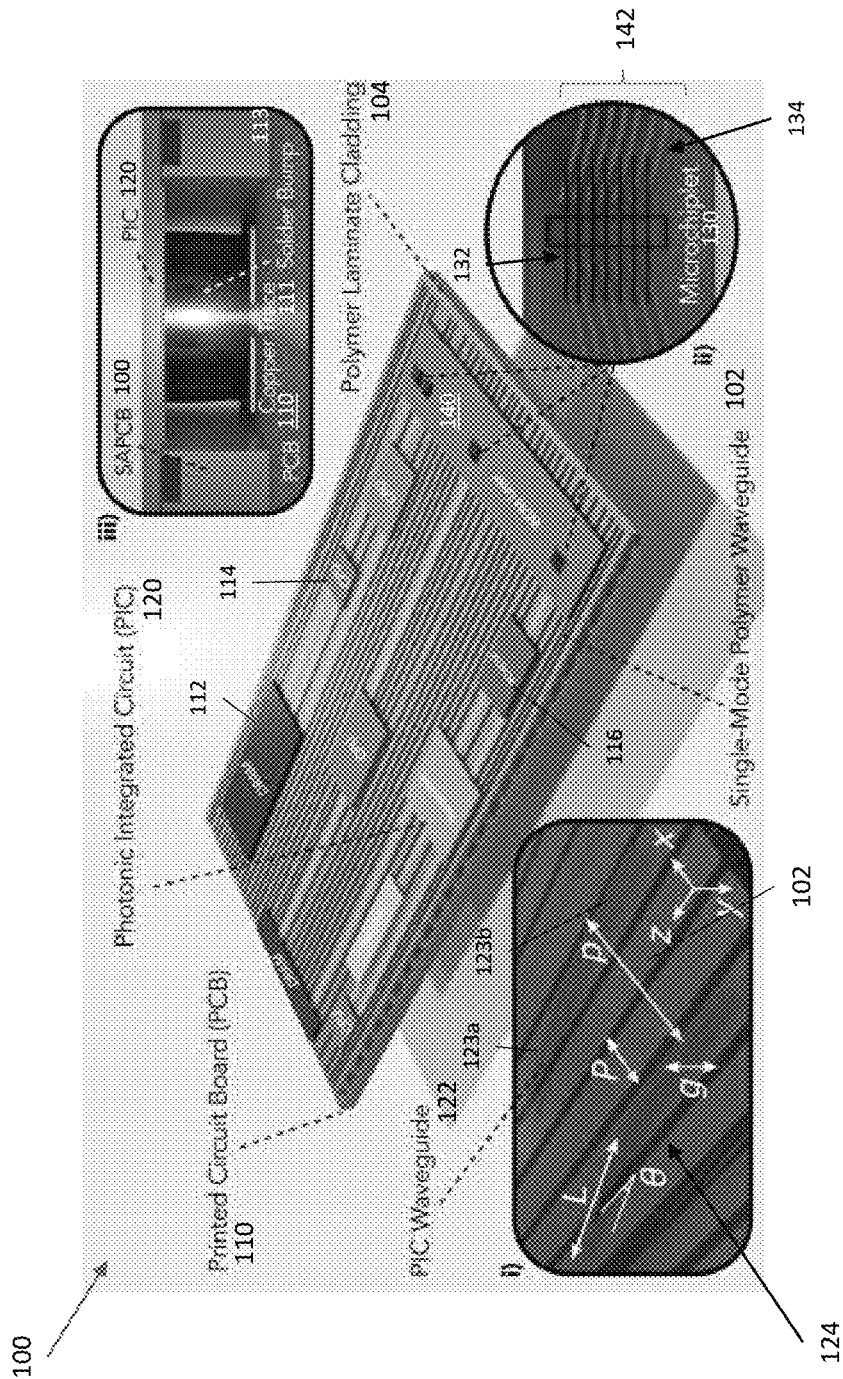
FIG. 1A shows a self-aligning photonic circuit board (SAPCB), with insets showing (i) a self-aligning coupler with a bent or "hockey stick" waveguide that crosses over a straight waveguide in a polymer film layer of the SAPCB, (ii) a microchiplet integrated into a PIC, and (iii) electrical connections (bump bonds) through holes in the polymer film layer.

FIG. 1A shows an example SAPCB 100, which is made of a polymer-laminate film 104 bonded onto an electrical printed circuit board (PCB) 110. PICs 120 are flip-chip bonded to the polymer film 104, which includes a linear, closely-spaced array of single-mode waveguides 102 that carry signals among PICs 210. The polymer waveguides 102 can be spaced with a pitch P that is smaller than the waveguide pitch p on the PIC 120, which permits arbitrary placement of PICs 120 and PICs 120 with different (and almost arbitrary) waveguide pitches. It also enables the transmit port of a chip to be paired easily to a receiver chip on another without co-designing both PICs 120 with the SAPCB 100.

The inset (i) at lower left in FIG. 1A illustrates a self-aligning coupler 124 that provides an efficient, board-level optical interconnect between the SAPCB 100 and a PIC 120. In this self-aligning coupler, a first portion 123a of a bent or "hockey-stick" waveguide 122 in the PIC crosses over a portion of a waveguide 102 in the polymer film layer 104 of the SAPCB 100 at an angle θ. The angle θ is chosen to efficiently transfer optical power through the interaction of their evanescent fields. The first or bent portion of the waveguide 122 has a length L and bends at the angle θ with respect to a second portion 123b of the bent or "hockey-stick" waveguide 122. The length L can range from 10-100 µm, and the bend angle can be up to 30° (e.g., 1°, 2°, 5°, 10°, 15°, 20°, 25°, or any other value up to about 30°). The second portion 123b may be roughly parallel to the waveguides 102 in the SAPCB 100, although this is not necessary.

The overlapping portions of the waveguides 102 and 122 are separated in they direction by a gap g, which is small enough for light to couple evanescently from the PIC waveguide 122 to the SAPCB waveguide 102 or vice versa. The angled crossing makes the self-aligning coupler insensitive to in-plane displacements and permits coupling over a wide range of waveguide pitches, including different pitches in the PIC 120 and the SAPCB 100. Additionally, crossing the two waveguides 102 and 122 at an angle eliminates any need to place PICs 120 onto the SAPCB 100 with sub-micron placement accuracy.

Self-aligning couplers 124 provide highly efficient coupling with generous alignment tolerances between the SAPCB 100 and the PIC 120. Approaches such as adiabatic coupling or edge coupling have demanding alignment precision (e.g., lateral alignment better than 5 µm). To meet these strict alignment tolerances, PICs and substrates with adiabatic or edge couplers are often co-designed to ensure the placements of the polymer waveguides are matched to those of the PICs with micron-scale precision. In contrast, PICs 120 and SAPCBs 100 with self-aligning couplers 124 do not have to be co-designed thanks to the angled design of the self-aligning couplers 124. While off-axis alignment has historically been considered undesirable for optical coupling, here it provides a surprising benefit: the angled geometry of the self-aligning coupler 124 is invariant to any longitudinal displacement Δx (so long as the waveguides overlap) and any transverse displacement Δy<L sin θ. Additionally, the transverse displacement tolerance can be increased arbitrarily by increasing the length of the coupler L.

Angled coupling introduces other benefits during assembly. Not only can the polymer waveguides 102 and PIC waveguides 122 be designed separately, but they can also have different pitches p and P, respectively, as shown in FIG. 1A. No matter their respective pitches, as long as the two waveguides 102 and 122 are coarsely aligned within L sin θ, they should cross at some point with little to no transmission penalty. The SAPCB 100 could therefore serve as an off-the-shelf, universal connector interfacing PICs 120 of different designs. If the polymer waveguide pitch p is smaller than the waveguide pitch P on the PIC 120, then two PICs 120, potentially with different waveguide pitches and optical port locations, could be coupled to one another through a single mode polymer waveguide 102. To ensure that no waveguide 122 on the PIC 120 couples to more than one polymer waveguide 102, the polymer waveguide pitch P should be smaller than L sin θ.

In addition to board-level assembly, the self-aligning coupler also enables simplified "pick-and-place" integration of microchiplets 130 into photonic circuits. Microchiplets 130, which are miniaturized photonic chips with isolated waveguides 132, have recently been demonstrated for integrating gain or single-photon sources into PICs 120. In FIG. 1A, for example, a PIC backbone 140 (wavelength-division multiplexed (WDM) laser PIC) has windows etched into cladding for chiplets 130 to be coupled to the circuit.

Figure 1B:
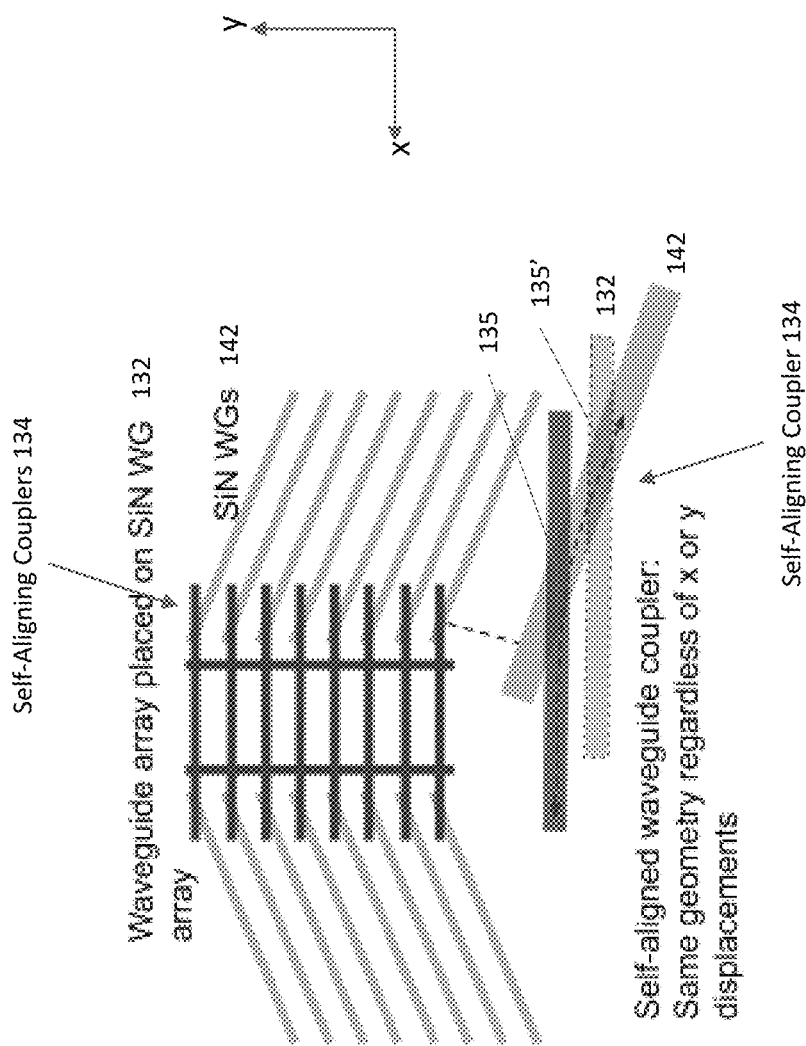
FIG. 1B shows the integration of the microchiplet integrated into the PIC in greater detail and the translational invariance of the waveguides in the bent couplers that connect the waveguides in the microchiplet to the waveguides in the PIC.

The inset (ii) at lower right in FIG. 1A shows how similar self-aligning couplers 134 simplify alignment and "pick-and-place" integration of microchiplets 130 into PICs. FIG. 1B shows these self-aligning couplers 134 in greater detail. The microchiplet 130 is placed on the PIC 140 that includes arrays of parallel SiN waveguides 142. When the microchiplet 130 is placed on the PIC 140, the ends of parallel waveguides 132 in the microchiplet 130 cross over the ends of the SiN waveguides 142 in the PIC 142 at an angle θ as shown in FIGS. 1A and 1B. The pitches of the waveguides 132 and 142 can be the same or different and are chosen so that an end of a given waveguide 132 in the microchiplet 130 overlaps at most the end of one waveguide 142 in the PIC 140. Each pair of crossed waveguides 132 and 142 is separated by a gap in the z direction that is small enough for light to couple evanescently between them.

The lower right of FIG. 1B illustrates a path (dashed, double-headed arrow) followed by light that couples between a pair of crossed waveguides 132 and 142. Translating the waveguides 132 and 142 with respect to each other in the x-y plane does not change the amount of overlap 135 between the waveguides 132 and 142. In other words, the shape and area of the crossed region 135 between the waveguides 132 and 142 remain constant, even if one waveguide is shifted laterally relative to the other waveguide (e.g., in the x or y direction). Because the coupling efficiency of the self-aligning coupler 134 scales with the length of overlap area, the coupling efficiency remains relatively constant even if the microchiplet 130 is not perfectly aligned with the PIC 140 in the x-y plane.

The SAPCB 100 can also accommodate electrical connections between the PCB 110 and PICs 120 or electronic components, such as dynamic random-access memory (DRAM) 112, central processing units (CPUs) 114, reconfigurable optical add-drop multiplexers (ROADMs) 116, or other electronic components. The inset (iii) at upper left in FIG. 1A shows an electrical connection in the form of a bump bond between a copper trace 111 in or on the PCB 110 and a PIC 120. A solder bump 113 bonds the copper trace 111 to an electrical contact on the PIC 120 through a hole punched through the polymer film 104.

Coupled-Mode Theory Analysis of Self-Aligning Couplers

Figure 2B:
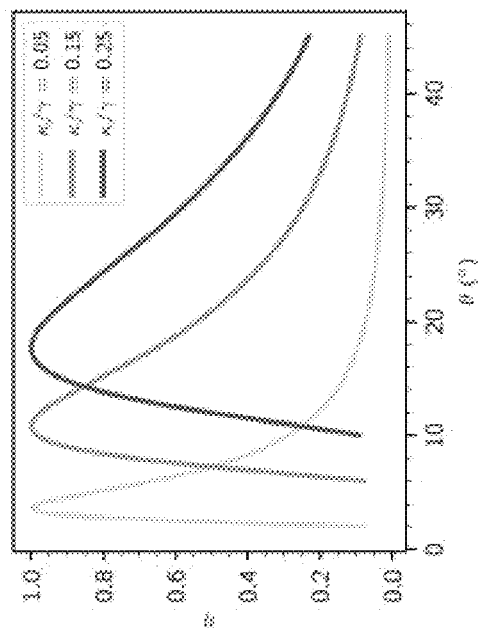
FIG. 2B is a plot of theoretical power transfer between the bent coupler and straight waveguide in FIG. 2A.
Figure 2A:
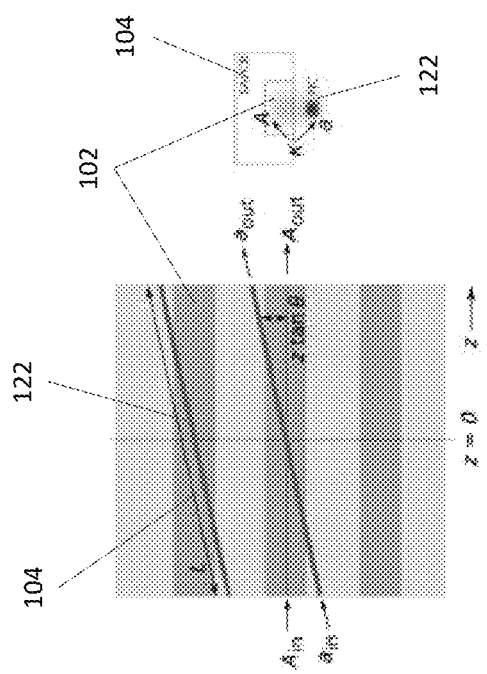
FIG. 2A shows a self-aligned coupler modeled as evanescently coupled, overlapping waveguides.

FIG. 2A shows two waveguides 102 and 122 that can be used to model the dynamics of a self-aligning coupler with coupled mode theory. The waveguides are weakly coupled vertically to one another at an off-axis angle θ and cross each other at a distance along their lengths defined as z=0. When the two waveguides intersect one another, their interaction can be described by a coupling constant per unit length κ and a wavevector mismatch Δ. At an arbitrary distance z along one of the waveguides, Δ remains unchanged, but κ exponentially decays with the transverse offset $|z| \tan \theta$. The waveguide coupling can therefore be modeled as $\kappa(z) = \kappa e^{-\gamma |z| \tan \theta} = \kappa e^{-\gamma' |z|}$, where $\gamma' = \gamma \tan \theta$ describes the decay of κ with transverse offset per unit length.

The following coupled mode equations describe the interaction between the two waveguides with amplitudes a (PIC) and A (SAPCB):

$$i \frac{d}{dz} \begin{bmatrix} a_{out} \\ A_{out} \end{bmatrix} = \begin{bmatrix} \frac{2\pi}{\lambda} n_{PIC} & \kappa e^{-\gamma' |z|} \\ \kappa e^{-\gamma' |z|} & \frac{2\pi}{\lambda} n_{SAPCB} \end{bmatrix} \begin{bmatrix} a_{in} \\ A_{in} \end{bmatrix}$$

The dimensions of the two waveguides are chosen to ensure that their effective mode indices $n_{PIC}$, $n_{SAPCB}$ are equal, i.e., $\Delta = 2\pi (n_{SAPCB} - n_{PIC})/\lambda = 0$. Analytically solving these equations provides the power transfer efficiency η at an angle θ when the effective indices are matched:

$$\eta = \left| \frac{A_{out}}{a_{in}} \right|^2 = \sin^2 \left( \frac{2\kappa}{\gamma \tan \theta} \right)$$

The power transfer efficiency η reaches unity when the argument of the sine function is π/2, i.e., $\theta_{opt} = \arctan[(4/\pi) \kappa/\gamma]$. The 3-dB angular tolerance Δθ is therefore:

$$\Delta \theta = \arctan \left[ \frac{8\kappa}{\pi \gamma} \right] - \arctan \left[ \frac{8\kappa}{3\pi \gamma} \right] \approx \left( \frac{16}{3\pi} \right) \frac{\kappa}{\gamma} = \frac{4}{3} \theta_{opt}$$

where $\tan^{-1} \theta \approx \theta$ for small coupling angles θ.

FIG. 2B is a plot of the theoretical power transfer efficiency η of a self-aligning (bent) coupler versus the coupling angle θ for different values of κ/γ. It shows that in addition to potentially arbitrary lateral tolerance, depending on the value of L, the self-aligning coupler has high angular tolerance. At small values of θ, η oscillates rapidly from minimum to maximum power transfer. The self-aligning coupler should therefore have a coupling angle that is large enough to avoid this oscillatory behavior (e.g., θ≥2°, 6°, or 8° for κ/γ=0.05, 0.15, or 0.25, respectively).

This coupled-mode theory analysis confirms that this self-aligning coupling scheme therefore has two major advantages over conventional optical couplers:

High angular tolerance: The 1/tan θ dependence of η produces a large angular tolerance $\Delta \theta = (4/3) \theta_{opt}$. Moreover, η has a long tail that ensures modest coupling even at very large angular errors, greatly simplifying initial alignment. Coupling the waveguides more strongly (increasing κ/γ) further increases Δθ.

Robust design: no matter then values of κ, γ, the coupling efficiency reaches unity at some angle. This suggests that fabrication-induced variation in κ can therefore always be corrected during alignment. No matter the design, the angled coupler allows efficient power transfer by rotating one waveguide relative to the other. By contrast, errors in κ from the designed value reduce the efficiency of conventional adiabatic and directional couplers. It may not be possible to correct these errors in conventional adiabatic and directional couplers after fabrication.

Simulated Performance of Self-Aligning Couplers

FIGS. 3A-3F show the results of finite-difference time-domain simulations (Lumerical FDTD Solutions) of an example physical implementation of the SAPCB shown in FIG. 3G using the parameters in TABLE 1 (below). These simulations assumed high-index single-mode polymer core SAPCB waveguides 102 in a low-index fluoropolymer cladding 104 separated by a gap g from silicon nitride (SiN) PIC waveguides 122 with silicon dioxide cladding. SiN is a high-index contrast waveguide platform transparent over visible and infrared wavelengths and is available in most silicon photonics and complementary metal-oxide-semiconductor (CMOS) foundries. The simulations assumed a wavelength λ=1550 nm. The optimized design exhibits less than 0.2 dB insertion loss.

TABLE 1

Simulation Parameters

| Polymer core n | 1.575 |
| Polymer cladding n | 1.34 |
| Polymer core dn/dT | $-1.1 \times 10^{-4}/°$ C. |
| Polymer cladding dn/dT | $-5 \times 10^{-5}/°$ C. |
| PIC waveguide core n | 2 |
| PIC waveguide cladding n | 1.445 |
| PIC core dn/dT | $2.51 \times 10^{-5}/°$ C. |
| PIC cladding dn/dT | $9.6 \times 10^{-6}/°$ C. |
| SiN width | 462.5 nm |
| Polymer width | 1.6 μm |
| SiN height | 300 nm |
| Polymer height | 1 μm |
| Gap (g) | 1 μm |
| Length (L) | 100 μm |
| $\theta_{opt}$ | 4.4° |
| Wavelength (λ) | 1550 nm |

FIG. 3A plots the effective mode indices as a function of the SiN and polymer waveguide widths. For efficient mode transfer between the waveguides, the waveguides should have matching propagation constants. This can be accomplished engineering the geometries of the waveguides. Mismatched waveguide propagation constants dominate fabrication-induced error.

FIGS. 3B-3F plot the effect on transmission caused by errors in, respectively, SiN width, SiN height, coupling gap g, wavelength, and temperature. The self-aligning coupler is remarkably robust to changes in all of these parameters, exhibiting less than 0.5 dB penalty for a ±20 nm variation in waveguide dimensions and lower than 0.3 dB excess loss for a ±100 nm change in the coupling gap g. Moreover, it has a 1-dB optical bandwidth in excess of 180 nm, which is comparable to inverse tapers used in edge coupling, and less than 0.5 dB temperature sensitivity over a range of 80° C. The results in FIGS. 3A-3F are from FDTD simulations of the full structure.

Figure 3G:
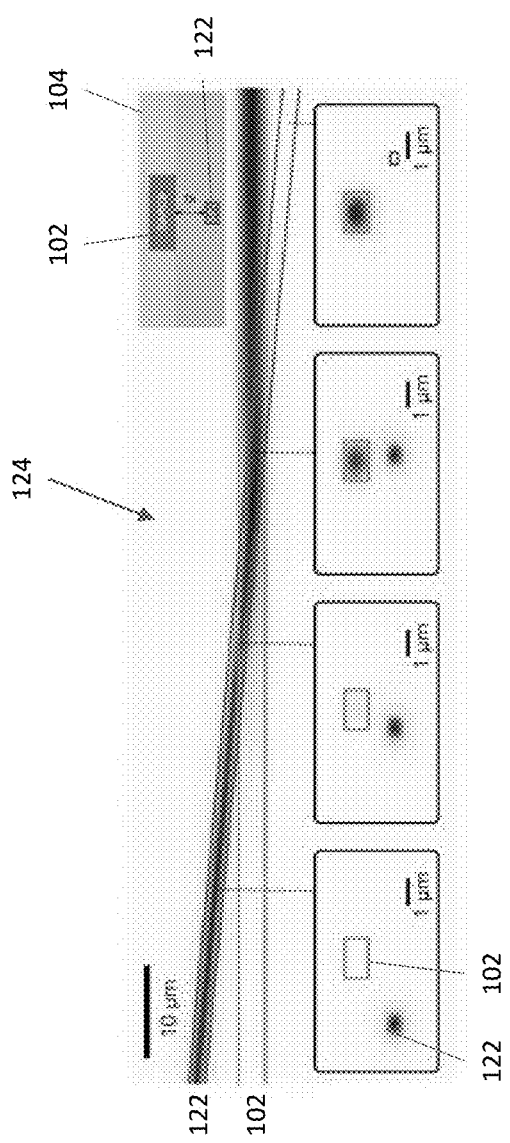
FIG. 3G illustrates the field profile of the self-aligning coupler with parameters in Table I. The insets below show the cross-sectional field profile at different points along the self-aligning coupler.

FIG. 3G shows these FDTD simulations for the parameters of TABLE 1. The upper portion of FIG. 3G is a plan view of the simulated self-aligning coupler 124, with shading illustrating the power transfer from the SiN waveguide 122, through the self-aligning coupler 124, and into the polymer waveguide 102 (or vice versa, depending on the propagation direction). Cross sectional field intensity plots along the structure are shown underneath in FIG. 3G.

FIG. 4A is a plot of power transfer efficiency 77 versus coupling angle θ for self-aligning couplers 124 like those in FIG. 3G with coupling gaps of g=1 μm and g=0.5 μm. The solid lines indicate FDTD simulation results, while the dotted lines are fit to equation for power transfer efficiency η given above. The waveguide intersection causes a scattering loss of about 0.2 dB at the optimal coupling angle θ. Upon correcting for this loss, η agrees well with the expression given above around this region and exhibits an angular alignment (3 dB) tolerance Δθ>5 degrees. Additionally, η rolls off slowly for $\theta > \theta_{opt}$, permitting modest coupling efficiencies at even large angular errors. This feature of self-aligning couplers greatly simplifies initial alignment and relaxes constraints on the alignment precision during packaging.

FIG. 4B is a plot of insertion loss $(|a_{out}|^2 + |A_{out}|^2)/|a_{in}|^2$ as a function of coupling angle θ. At large coupling angles, there is significant radiation loss due to the non-adiabatic nature of the intersection.

Without being bound by any particular theory, the scattering loss shown in FIG. 4A results primarily from a faster-than-adiabatic transition at the waveguide intersection and increases with θ as the transition into the hybridized modes becomes more abrupt. This loss is particularly significant at large θ, shown in FIG. 4B, which accounts for the discrepancy compared to theory at these angles. The scattering loss drops with increasing gap g, which makes the transition more adiabatic. Increasing the gap g introduces two tradeoffs, however: the angular tolerance Δθ drops, and the transmission becomes more sensitive to errors in Δ. If higher insertion losses are acceptable, the waveguides can be coupled more strongly, which improves Δθ. FIG. 4A also shows such an example, where the gap g is decreased to 500 nm. κ/γ, and, therefore, the angular misalignment tolerance, Δθ, nearly doubles, but at the expense of a higher insertion loss of 1 dB. The tradeoffs between insertion loss, robustness to fabrication error, and Δθ bound an optimal range for κ and therefore g.

FIGS. 5A and 5B illustrates the performance of self-aligning coupler that interfaces a 500×220 nm silicon photonic waveguide to a 640×300 nm indium phosphide (InP) waveguide for hybrid integration of gain. Silicon and InP have much higher refractive indices ($n_{Si}$=3.47; $n_{InP}$=3.17) and therefore confine the optical mode more strongly; as a result, the optical mode is significantly less perturbed by the introduction of the other waveguide at the intersection. This stronger vertical confinement of the optical mode also reduces insertion losses.

FIG. 5A is a plot of transmission versus coupling angle θ for a self-aligning coupler designed to interface a 640×300 nm InP gain microchiplet to a 500×220 nm silicon photonic waveguide. The strong mode confinement in both materials eliminates scattering loss at the intersection, permitting mode transfer with no insertion loss. As a result, the transmission characteristic reproduces nearly perfectly the theoretical expression for transmission versus coupling angle given above.

FIG. 5B is a plot of transmission efficiency as a function of wavelength for the self-aligning coupler of FIG. 5A. It shows that the coupler has a 1 dB bandwidth exceeding 230 nm.

Figure 6:
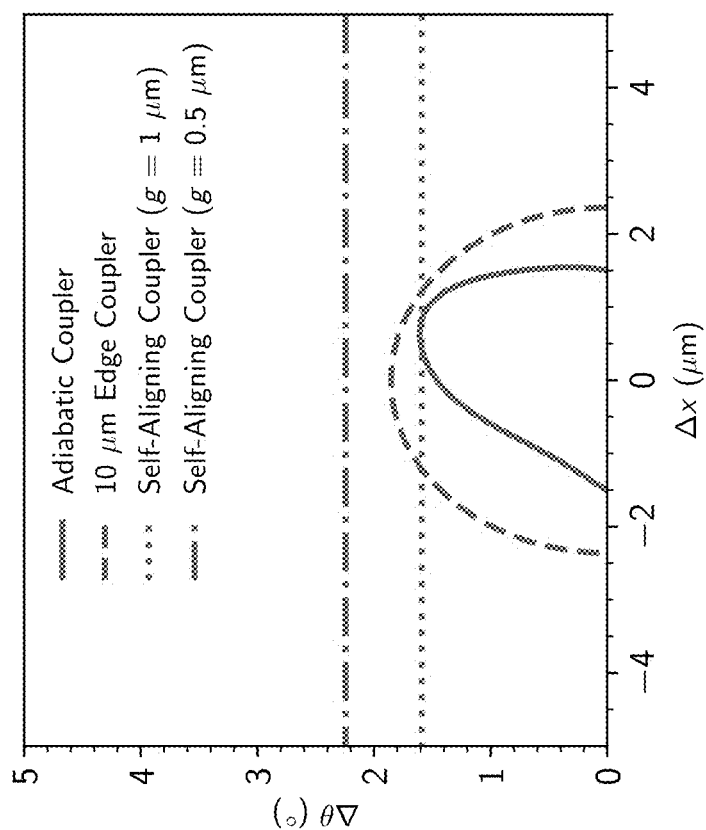
FIG. 6 is a plot of lateral and angular alignment tolerance of a self-aligning coupler compared to inverse tapered edge couplers and tapered adiabatic couplers. The lines indicate the 1-dB coupling efficiency contours for the different couplers.

Self-Aligning Couplers Versus Tapered Adiabatic and Inverse Tapered Edge Couplers FIG. 6 is a plot of the lateral and angular alignment tolerances of self-aligning couplers with different gaps, tapered adiabatic couplers, and 10 μm inverse tapered edge couplers for the same materials platform used in FIGS. 3A-3F. The traces in FIG. 6 are the 1 dB coupling efficiency contours in the Δx-Δθ plane for the different couplers.

Non-perturbative approaches, such as edge coupling (EC), have a fundamental tradeoff between the lateral and angular tolerances in coupling efficiency. Assuming the mode $E_{wg}(\vec{r})$ produced when the waveguide couples into free space is Gaussian, one can calculate the mode overlap $$\eta_{EC} = \frac{\left|\int E^*_{wg}(\vec{r}) E_{fiber}(\vec{r}) d^3 r\right|^2}{\int |E_{wg}(\vec{r})|^2 \int |E_{fiber}(\vec{r})|^2},$$

with the input fiber mode $E_{fiber}(\vec{r})$, also assumed to be Gaussian but misaligned by an angle δθ and transverse distance δx. Assume that $E_{fiber}(\vec{r})$ and $E_{wg}(\vec{r})$ have identical beam waist radius $w_0$; therefore, $\eta_{EC}$ is unity when there is no misalignment. For an angular error δθ in the paraxial limit, the absolute value of the mode overlap is:

$$|\eta_{EC}(\delta x, \delta\theta)| = \exp\left(-\frac{\delta x^2}{w_0^2} - \frac{k^2 w_0^2}{4}\delta\theta^2\right).$$

This translates to a fundamental tradeoff between the 3 dB lateral (Δx) and angular (Δθ) tolerances:

$$\Delta x \Delta\theta = w_0\left(\frac{2}{kw_0}\right) = \frac{2}{k} = \frac{\lambda}{\pi n}.$$

This tradeoff does not apply to the self-aligning coupler, which has both a high angular tolerance and an arbitrarily high lateral tolerance that can be increased by increasing L. As a result, the combined lateral and angular tolerance ΔxΔθ of a self-aligning coupler exceeds the fundamental limit on alignment tolerances for edge coupling. Expanding or contracting the beam size improves the alignment tolerance of edge coupling in one dimension at the expense of the other; thus, an edge coupler cannot have both superior lateral and superior angular tolerance to that of a self-aligning coupler.

Adiabatic couplers, on the other hand, taper one or both waveguides to induce an avoided crossing between the two eigenmodes, which adiabatically transfers power from one waveguide to the other. This adiabatic transition makes an adiabatic coupler robust to variation in Δ, which has led to them being favored in many photonic platforms for their resilience to fabrication error. This robustness comes at the cost of alignment tolerance, however, as small lateral or angular errors render the interaction non-adiabatic, resulting in little or no power transfer. The adiabatic coupler in FIG. 6 is designed to transfer power from SiN to the polymer waveguide; the SiN waveguide width tapers linearly from 550 to 320 nm over a length of 200 μm and achieves an efficiency of 96%, which is comparable to that of the optimized self-aligning coupler. FIG. 6 shows the transmission penalty as a function of Δx, Δθ.

The combined lateral and angular tolerance of a self-aligning coupler is therefore higher than conventional optical couplers. The self-aligning coupler achieves this performance by making use of perturbative coupling, which does not suffer from a fundamental limitation on ΔxΔθ, and by being largely invariant to lateral displacements. This lateral tolerance is increased by choosing both waveguides in the self-aligning coupler to not be tapered, with the one tradeoff being that the effective indices of the waveguides should be matched.

System Integration and Outlook

Figure 7A:
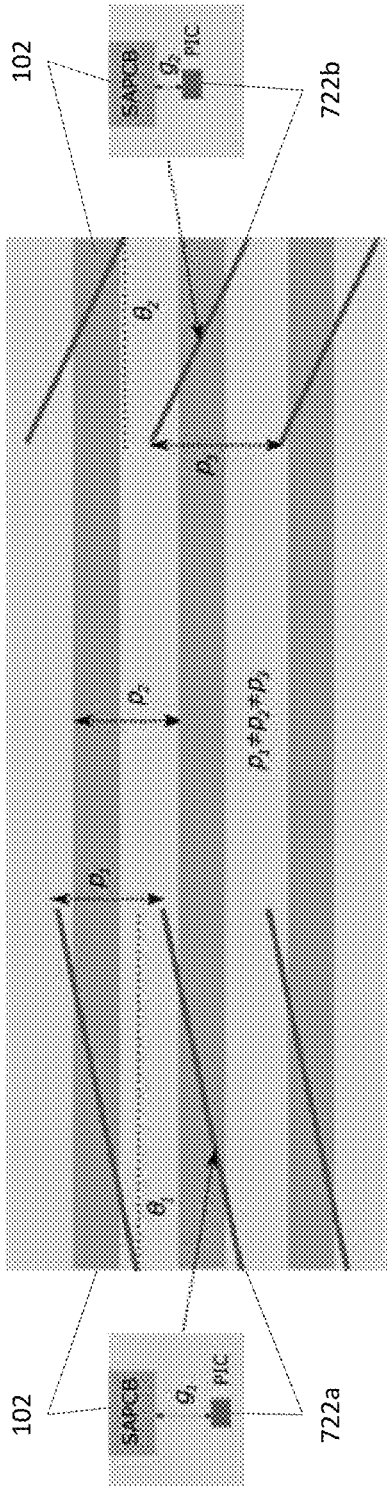
FIG. 7A illustrates interfacing two photonic circuits with different waveguide pitches and process stacks.
Figure 7B:
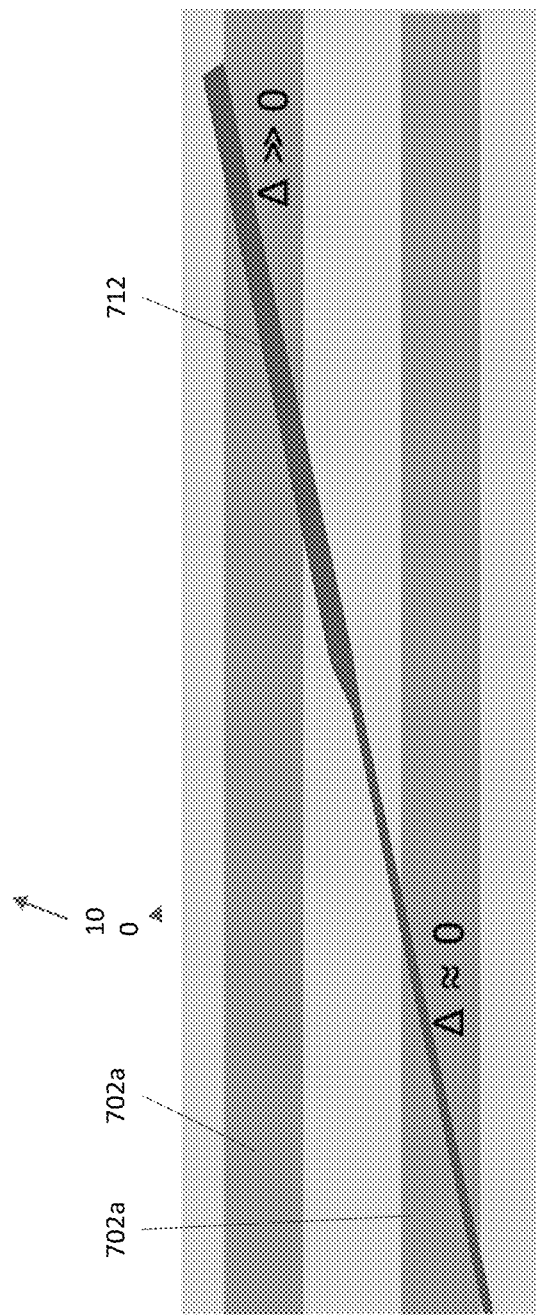
FIG. 7B shows a waveguide in a first PIC crossing over a waveguide in a second PIC with little to no crosstalk.

FIGS. 7A and 7B show two possible applications of the SAPCB 100 for system-level integration. FIG. 7A illustrates interfacing two PICs with different waveguide pitches and process stacks, perhaps fabricated by different foundries (for clarity, FIG. 7A shows only the waveguides 722a and 722b of these PICs). As the waveguides 722a and 722b interface with the polymer waveguides 102 in the SAPCB 100 at (different) angles, the off-axis intersection guarantees that both sets of waveguides 722a, 722b can couple into the same waveguides 102 on the SAPCB 100. The two PICs may also not have the same process stack; for instance, one vendor may want a larger oxide passivation layer, resulting in a larger coupling gap (e.g., $g_1 > g_2$ as shown in FIG. 7A) to the polymer waveguide 102. The vendor can address this by simply modifying the coupling angle θ to preserve efficient power transfer. Thus, the SAPCB 100 could allow standardization of photonic components; for example, the geometry of the SAPCB 100 could be a published standard, while each PIC vendor designs the couplers to the SAPCB 100 on their own PIC depending on their process stack and application.

FIG. 7B demonstrates another advantage originating from the need for Δ≈0 for efficient coupling. Suppose a polymer waveguide 712 carrying a signal from one PIC needs to travel over a waveguide 702a in a second PIC with little to no crosstalk. By engineering the dimensions of the polymer waveguide 712 (and/or of the waveguide 702a in the second PIC), one can ensure the waveguide 702a in the second PIC has a strong wavevector mismatch Δ with the polymer waveguide 712, allowing for crosstalk-free transmission of signals over many photonic components on a board. The polymer waveguide 712 can also be engineered (e.g., with a different width along part of its length) to have a strong or close wavevector match with another waveguide 702b in the second PIC.

Figure 8B:
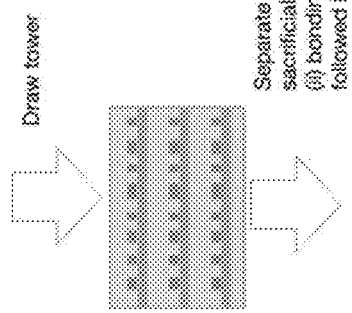
FIGS. 8A and 8B illustrate methods of making SAPCBs.
Figure 8A:
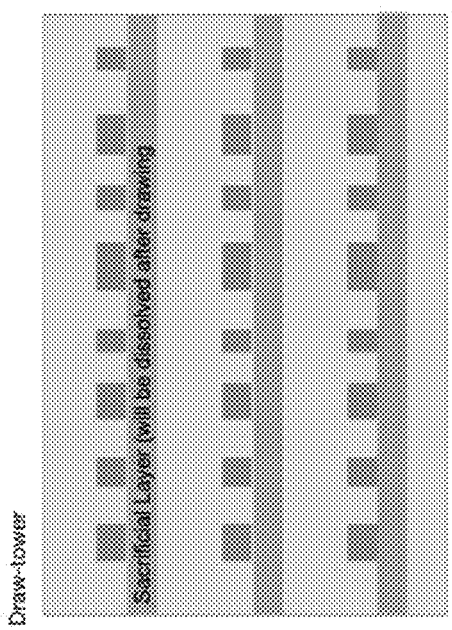

Bent waveguides for self-aligning couplers can be defined on a SAPCB, on a PIC, or both. Advanced photolithography processes can be used to define the geometry and angle precisely for a bent waveguide on PIC. Creating bent waveguides on PICs frees the SAPCB to include only linear arrays of polymer waveguides, with no bends or tapering required. The simple layout of the polymer waveguides could allow the SAPCB to be fabricated by fiber pulling approaches from a preform as shown in FIG. 8A instead of more expensive lithography processes like those shown in FIG. 8B. Polymer waveguides have a wide transparent window, making the SAPCB applicable to visible integrated photonics.

Universal-Pitch Self-Aligning Photonic Interconnect Couplers (USPICs)

Figures 9A, 9B:
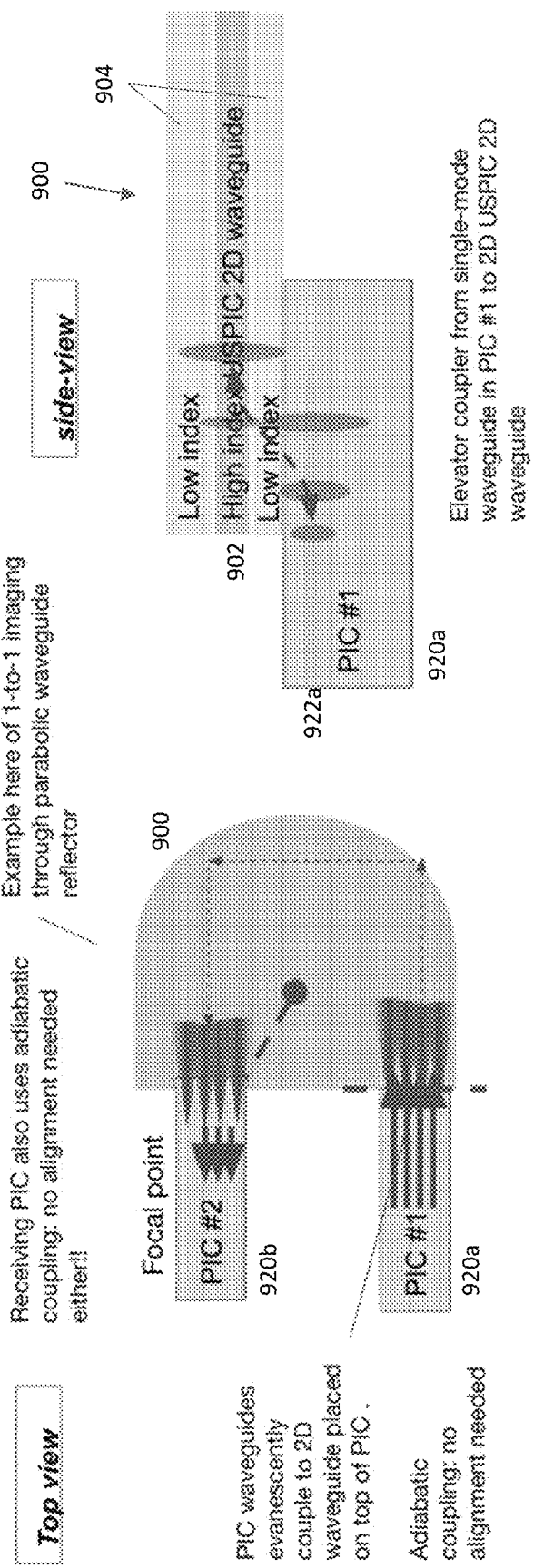
FIG. 9A shows a top view of a Universal-pitch Self-aligning Photonic Interconnect Coupler (USPIC) connecting arrays of waveguides on different PICs.
FIG. 9B shows a side view of a USPIC connecting arrays of waveguides on different PICs.

FIGS. 9A and 9B show plan and profile views, respectively, of another type of self-aligning coupler called a two-dimensional (2D) Universal-pitch Self-aligning Photonic Interconnect Coupler (USPIC) 900. The USPIC 900 includes a planar focusing element 902 between a pair of cladding layers 904. The bottom cladding layer 904 can be thin (e.g., roughly micron thick) and made of a low-index material. The waveguiding (core) layer 902 is made of a higher index material (for example, SU-8 polymer with a refractive index of 1.6). And the upper cladding layer 904 is made of low-index material that can be as thin as a few microns or much thicker, depending on whether the USPIC 900 is rigid or flexible. The planar focusing element 902 is a slab waveguide with a curved edge (e.g., a parabolic edge) that borders the cladding material, air, or another material with a lower refractive index. It confines light to a plane between the cladding layers 904 and focuses light within that plane.

The USPIC 900 in FIGS. 9A and 9B connects four single-mode waveguide modes between PICs 902a and 920b. The top view in FIG. 9A illustrates the coupling from PIC 920a of four beams into the 2D USPIC 900, which is shown here with a parabolic reflector to image the beams at a 1:1 magnification to PIC 920b, where the beams are again evanescently coupled into that PIC's waveguides. The side view in FIG. 9B shows the adiabatic (slow compared to the period of the electromagnetic mode) coupling between waveguides 922a in the first PIC 920a and the USPIC 900. In this case, the USPIC 900 sits on top of and partially overlaps both PICs 920a and 920b. The PICs 920a and 920b can also be on opposite sides of the USPIC 900 (i.e., top and bottom instead of both on the top side or the bottom). The USPIC 900 can also couple light between waveguides in different sections of the same PIC.

A variety of optical components can be directly integrated into a USPIC. For example, a USPIC may include an integrated beam splitter to couple light into and/or out of the USPIC. Such a beam splitter can be made using a thin slit illuminated under total internal reflection so that a fraction of light crosses the slit to the other side. Other components suitable for integration into a USPIC include gratings, grating filters, and nanophotonic components, which can be made by patterning refractive index changes into the USPIC's waveguide layer with a spatial period, orientation, and location selected to diffract incident light. For example, a USPIC can include a wavelength-dependent vertical grating coupler that couples light at some wavelengths into or out of the plane of the USPIC's reflector and transmits light at other wavelengths. This could be useful for routing WDM signals among different picks or for filter pump and probe beams.

Figures 10A, 10B:
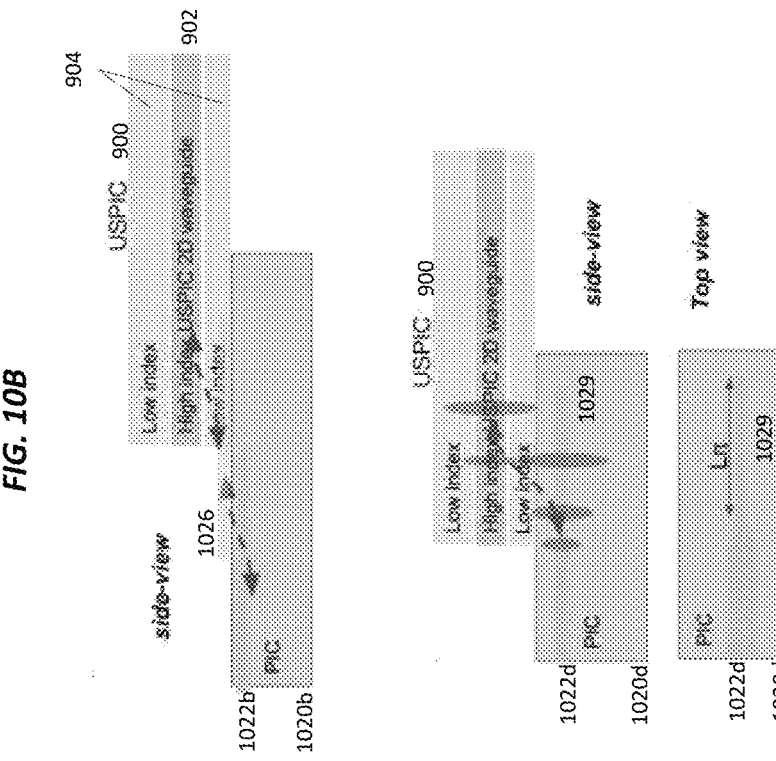
FIG. 10A is a side view of a tapered waveguide in a PIC that evanescently and adiabatically couples light into and/or out of a USPIC that overlaps an edge of the PIC.
FIG. 10B is a side view of a layer of high-index material between a PIC and a USPIC that evanescently and adiabatically couples light between the USPIC and a waveguide in the PIC.

FIGS. 10A-10D illustrate different elevator coupler configurations for coupling light between PICs and USPICs. FIG. 10A shows a PIC 1020a with an in-plane tapered waveguide 1022a that is evanescently coupled to a 2D USPIC 900. As seen in FIG. 10A, the PIC waveguide modes are brought near the top of the PIC 1020a, then the dimensions of the PIC waveguide 1022a are tapered so that the confined optical mode reaches ever further into the surrounding low-index material 1024a. For example, the PIC waveguide cores 1022a may be made of silicon (refractive index of 3.5), whereas the surrounding cladding material 1024a may be made of silica (refractive index of 1.5).

Alternatively, as shown in FIG. 10B, the waveguide core(s) 1022b buried in a PIC 1020b can be evanescently coupled to a (SiN) ridge waveguide coupler 1026 on top of the PIC's surface plane. The USPIC 900 is positioned over this region to droop over the ridge waveguide coupler 1026 on top of the PIC 1020b. To enhance the coupling to the USPIC 900, the USPIC 900 can be thermally molded onto the PIC 1020b so that the ridge waveguide coupler 1026 reaches into the bottom low-index layer 904 of the USPIC 900.

Figures 10C, 10D:
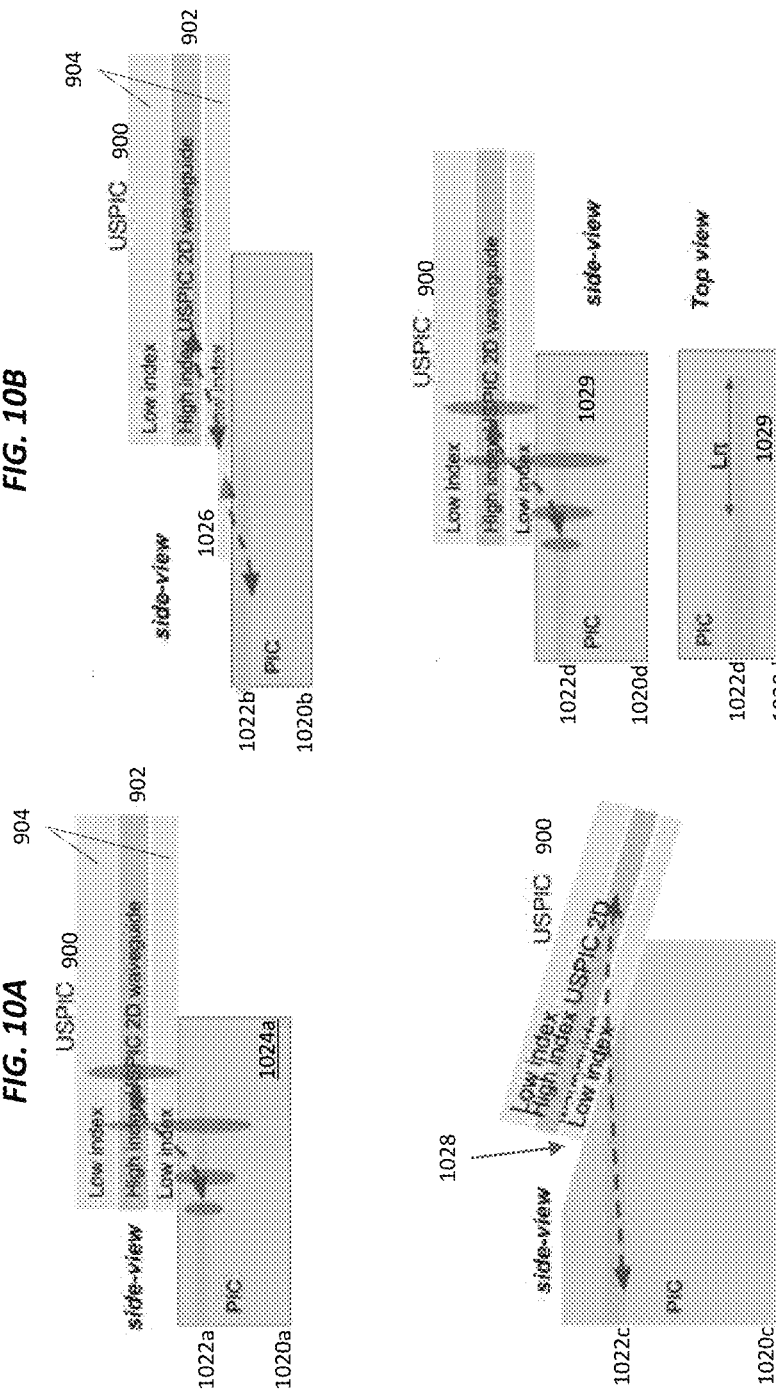
FIG. 10C is a side view of a PIC polished to taper one end of a waveguide that is coupled evanescently and adiabatically couples light into and/or out of a USPIC that overlaps an edge of the PIC.
FIG. 10D is a side view of a PIC-based waveguide with one end tapered to a width at which the waveguide mode has the same group index as the USPIC over a length equal to the half the coupling period between the PIC-based waveguide and the USPIC.

FIG. 10C shows a PIC 1020c with a vertically tapered waveguide 1022c that is evanescently coupled to a 2D USPIC 900. As illustrated in FIG. 10C, this way to realize an elevator coupler uses a vertical tapering of PIC waveguides 1022c by, for example, polishing an edge facet 1028 on the PIC 1020c.

Forming an adiabatic coupler in a PIC can, in some instances, impose lithography challenges on the minimum waveguide dimensions at the tip of the taper. If the taper ends too abruptly, the tip will scatter or reflect a fraction of the light guided by the waveguide instead of transferring it to the USPIC. FIG. 10D shows a PIC 1020d with a waveguide 1022d that ends in a tapered segment 1029. This tapered segment 1029 is evanescently coupled to a USPIC 900 on top of the PIC 1020d. The PIC waveguide 1022d is tapered down to a width at which the waveguide mode has the same group index as the slab layer 902 in the 2D USPIC 900. The 2D waveguide 902 in the USPIC 900 overlaps this tapered segment 1029 of the PIC waveguide 1022d for a certain length Lπ. Thanks to phase matching, the PIC waveguide mode can now couple to the 2D waveguide 902 in the USPIC 900. To prevent light in the USPIC 900 from coupling back into the PIC waveguide 1022d, Lπ is chosen so that it is exactly one half of a coupling period. This coupling could be considered the analog of evanescent directional coupling commonly used in PIC beam splitters.

Figure 11:
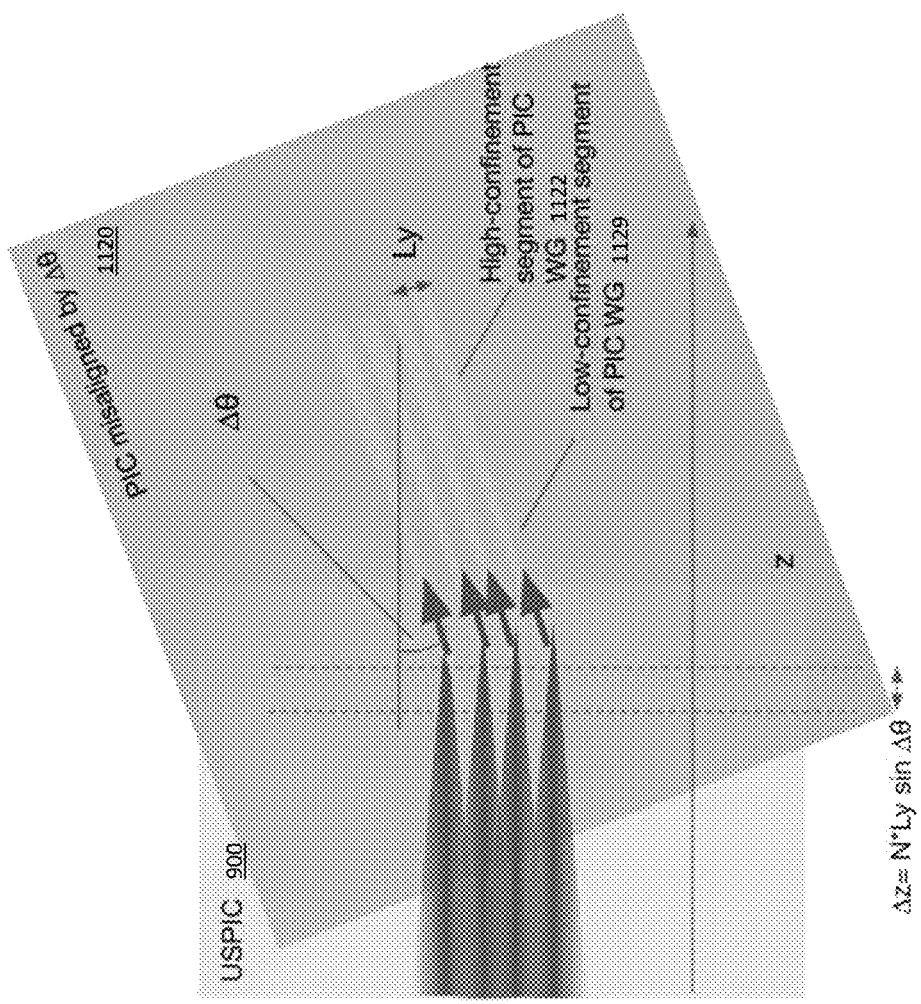
FIG. 11 shows that the angular alignment tolerance of a USPIC is much relaxed over approaches that involve aligning a single-mode waveguide in a PIC to a single-mode waveguide in a connector.

FIG. 11 illustrates the longitudinal displacement tolerance $\Delta z$ and angular alignment tolerance $\Delta\theta$ for coupling light between a USPIC 900 and one or more waveguides 1022 in a PIC 1020. Like the self-aligning couplers disclosed above, a USPIC has a much larger tolerance to misalignment than other types of couplers. Normally, for direct imaging, the beams should meet the couplers within their Rayleigh length. If the beams are characterized by a numerical aperture (NA) that quantifies the divergence inside the USPIC 900, the Rayleigh length is $z_R = \lambda/\pi(NA)^2$, where $\lambda$ is the wavelength. This implies that the longitudinal displacement tolerance $\Delta z < \lambda/\pi(NA)^2$. For practical numbers of NA≈0.1 and λ≈1 μm, the longitudinal displacement tolerance should be $\Delta z < 30$ μm.

Using evanescent coupling as illustrated in FIGS. 10A and 11 relaxes this focusing condition, since the (potentially very long) tapered portions 1129 of the waveguides 1122 in the PIC 1120 can cross the 2D waveguide portion 902 of the USPIC 900 in any one of many locations. To avoid crosstalk, no mode in the waveguide array 1122, which has a waveguide pitch $L_y$, should overlap with more than one mode in the 2D waveguide. Referring to FIG. 11, this means that $\Delta z \tan \Delta\theta < L_y$. For N waveguides, $\Delta z = NL_y \sin \Delta\theta$ as shown in FIG. 11, which means that $(NL_y \sin \Delta\theta) \tan \Delta\theta < L_y$, which in turn simplifies to $\sin \Delta\theta \tan \Delta\theta < 1/N$. For small angles $\Delta\theta$, the approximate angular alignment tolerance reduces to $\Delta\theta < 1/\sqrt{N}$.

USPIC 2D Waveguide

Figure 12:
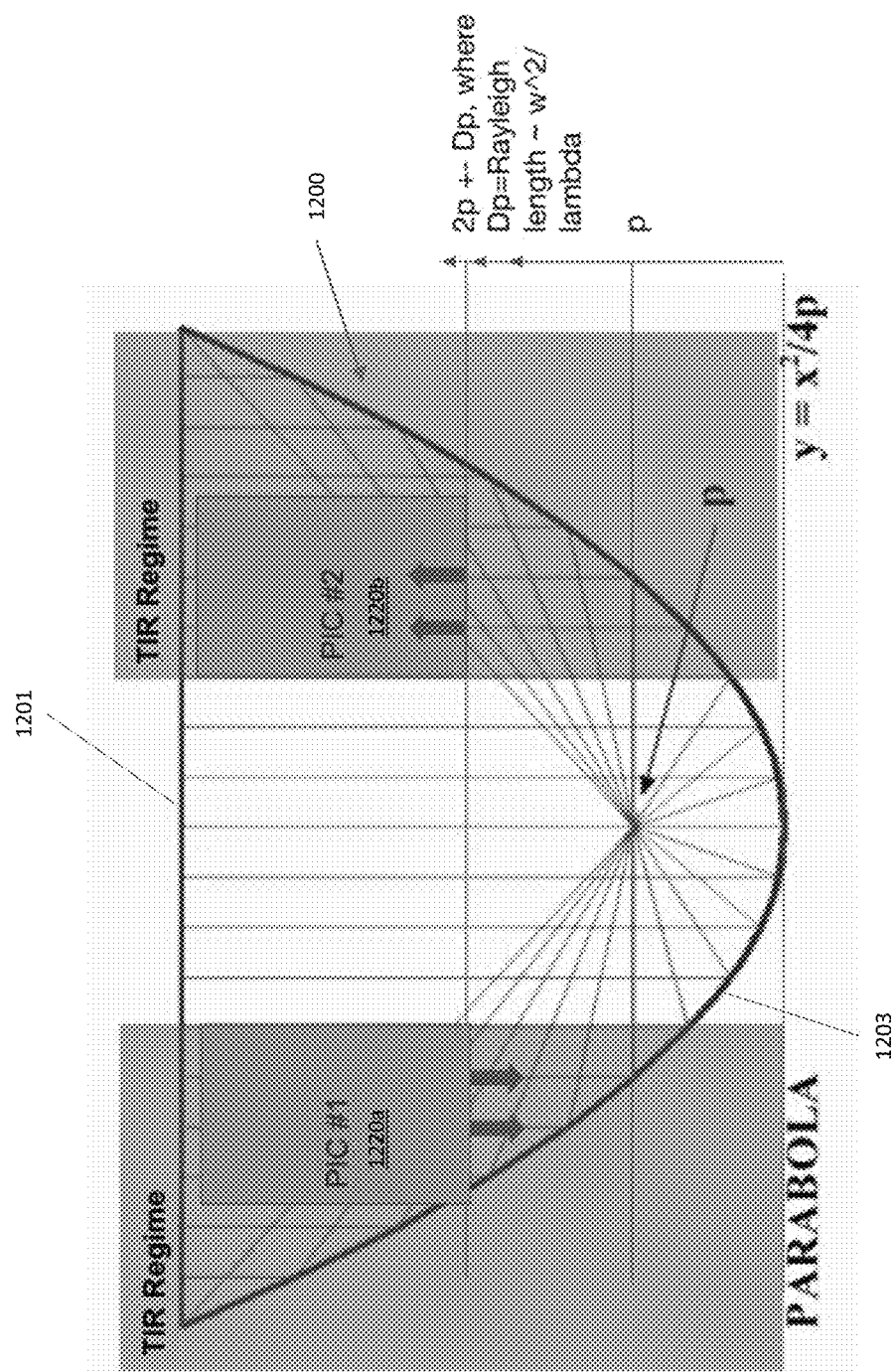
FIG. 12 shows a USPIC (parabolic outline) patterned to image an array of modes on one PIC to an array of modes on another PIC.

FIG. 12 shows a USPIC 1200 that couples light between a pair of PICs 1220a and 1220b. This USPCI 1200 has a straight edge 1201 that overlaps the top of the PICs 1220a and 1220b; on the opposing side of the USPIC 1200 is a parabolic edge 1203 that serves as a parabolic reflector. As illustrated in FIG. 11, the PICs 1220a and 1220b are positioned at a distance from the USPIC's center axis selected to ensure that the beams from the waveguides undergo total internal reflection at the boundary defined by the parabolic edge 1203 of the USPIC 1200. The rays in FIG. 12 trace the paths taken by the beams. In the wave picture, the beams diverge in the plane of the 2D waveguide layer of the USPIC 1200. The parabolic reflector refocuses them in its image plane, e.g., with 1:1 imaging as in FIG. 12. Magnification and demagnification between PICs are also possible by choosing the appropriate distances along the imaging axis of the USPIC 1200.

Since the beams propagating in the USPIC 1200 are not transversely confined by patterned ridges (as in waveguides typical in PICs), there are no edge roughness losses except perhaps at the point of reflection from the parabolic edge 1203 (which can be made very smooth as mentioned below). The top and bottom of the waveguide layer (e.g., layer 902 in FIG. 9B) in the USPIC 1200 can also be made very smooth (see below), so the primary loss may be due to absorption in the waveguiding material itself. In the case of SU-8 or PMMA, for example, these losses can be below 0.1 dB/cm in a wide wavelength range from blue to near infrared.

USPIC Fabrication

There are many different ways to make a USPIC. For example, a low-index polymer (e.g., PMMA) can be spin-coated on the flat surface of a rigid carrier, then dried and optionally annealed to use polymer reflow for a smooth surface (for PMMA, the reflow temperature is around 200° C. on a hot plate). Next, a high-index polymer, such as SU-8, is deposited on the low-index bottom polymer. At this point, optical lithography may be used to pattern the high-index layer into the desired shape(s), e.g., with a parabolic curved edge; alternatively, the entire stack can be patterned later. The high-index layer is dried and optionally annealed, then capped with another low-index polymer. These fabrication steps can be repeated to create multiple 2D waveguide layers for edge-coupling multiple chips, where the evanescent couplers are tiered (for example, using the edge facet tapered waveguide coupling of FIG. 13A, described below).

A USPIC can also be made from a pre-form with a high-index layer sandwiched between a pair of low-index layers. (For tiered USPICs, the pre-form can have many alternating high- and low-index layers.) These layers are several times thicker than ultimately desired. The pre-form is patterned into the desired shape (e.g., with a parabolic or curved edge opposite a straight edge), then stretched to the desired film thickness under heating to produce the USPIC. The pre-form can be patterned using optical lithography, cutting, or molding. Alternatively, the pre-form can be stretched, then cut and/or patterned into the desired shape.

To reduce surface roughness, additional thermal reflow steps can be used during fabrication. For example, the sample can be heated just above the melting point of the waveguiding material so that surface tension reduces out surface roughness.

USPIC Pitch-Reducing Element to Create a 3D Beam Array

Figure 13A:
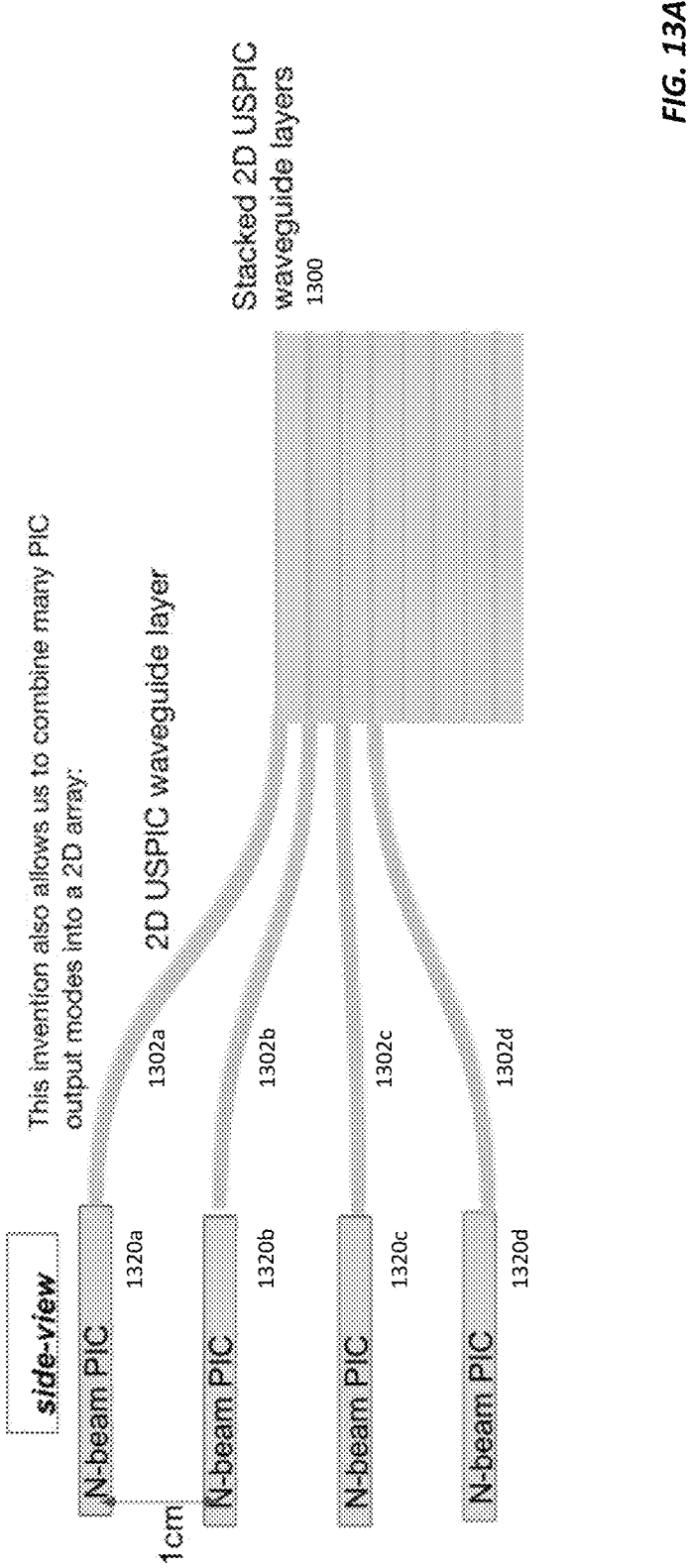
FIG. 13A shows how the outputs of multiple PICs can be combined into one stack of 2D waveguides (USPICs), allowing for 3D arrays of beams.

Because the polymer waveguides are malleable, it is possible to combine the outputs of many PICs into tightly packed arrays. For instance, FIG. 13A shows four separate PICs 1320a-1320d arrayed vertically, with parallel N-beam waveguide arrays arranged into and/or out of the page. The PICs 1320a-1320d are coupled to a USPIC stack 1300 via separate bent, flexible USPIC waveguide layers 1302a-1302d. This forms a pitch-reducing optical beam array that can be coupled to or formed into a 2D array of waveguides, where each waveguide can be connected to a PIC component, such as a modulator. 2D beam arrays at high speed or high power are not currently available and are useful for applications such as holography, beam steering/lidar, optical control of cold atoms or color centers, endoscopy, optical communications, etc.

Figure 13B:
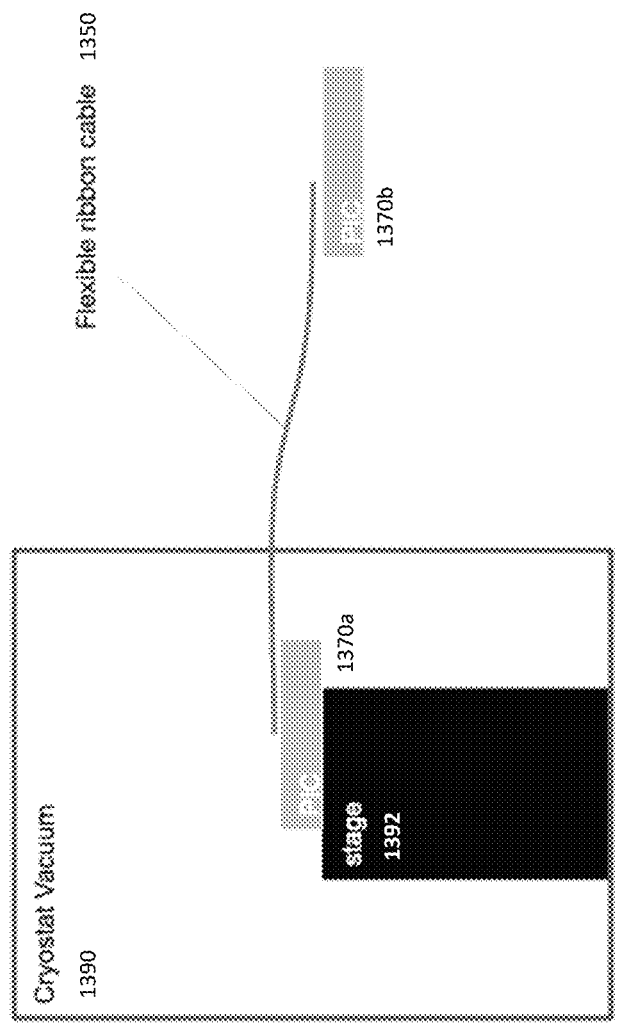
FIG. 13B shows a flexible USPIC connecting waveguides in a PIC in a cryostat to waveguides in a room-temperature PIC.

FIG. 13B shows a flexible USPIC 1350 connecting a cryogenically cooled PIC 1370a (e.g., at temperatures of 77 K or lower) on a stage 1392 in a cryostat 1390 to a PIC 1370b at room temperature (e.g., at a temperature of 285-300 K). The USPIC 1350 can be used as flexible photonic ribbon cables interfacing the PICs 1370a and 1370b. This flexible photonic ribbon cable 1350 enables flexible interconnects between photonic subsystems, much like electrical ribbon cables are used for connecting electrical subsystems. Other photonic ribbon cables are not self-aligning and are thus more difficult to align and maintain. In particular, maintaining optical alignment is challenging for cryogenic applications, where one or more optical waveguides are connected to a PIC. The different thermal expansion coefficients of the materials in PICs, epoxies, and optical fibers used for conventional coupling cause material length changes, preventing typical fiber attachment methods, such as gluing. The self-aligning USPIC 1350 solves that problem and therefore provides easy to align, reliable photonic interconnects between components inside and outside the cryostat 1390.

USPIC Relays

Figure 14:
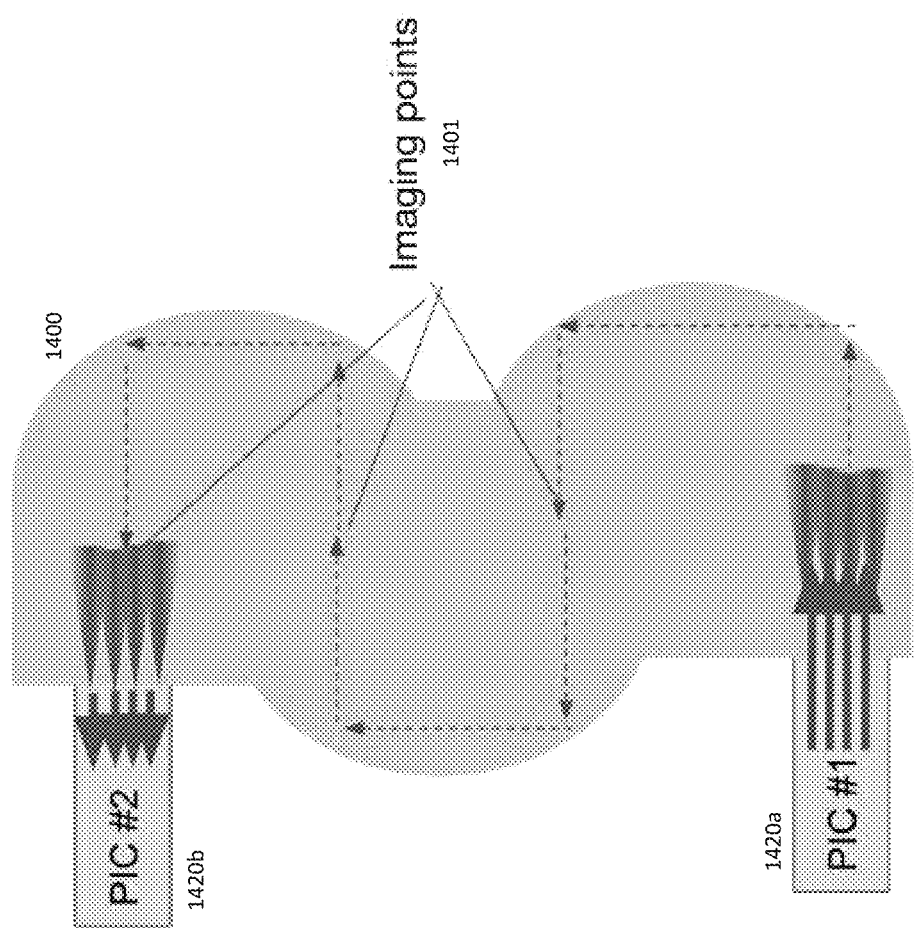
FIG. 14 shows concatenated USPICs that relay of image of outputs from waveguides in one PIC to inputs of waveguides in another PIC.

FIG. 14 shows a relay 1400 of 2D imaging USPICs that bridges a longer distance between a pair of waveguide arrays 1420a and 1420b. This relay 1400 includes multiple USPICs, merged together in the same plane, with curved (e.g., parabolic or circular) edges that face in opposite directions to image the output facets of waveguides in PIC 1420a to the input facets of waveguides in PIC 1420b via intermediate image planes 1401. (Similarly, light can be relayed through stacked or overlapping discrete USPICs such that light from one USPIC is evanescently coupled into another USPIC.) In this case, the imaging is 1:1 (i.e., unity magnification), so the curved edges have identical shapes. The curved edges can also have different shapes or radii of curvature to magnify or demagnify the images of the waveguide facets, e.g., to accommodate waveguide arrays with different pitches. The relay 1400 can have more or fewer curved edges, depending on the distance separating the two PICs 1420a and 1420b and the orientation of the waveguides in the PICs 1420a and 1420b with respect to each other.

Tapered Waveguide Phased Array

Figures 15A, 15B:
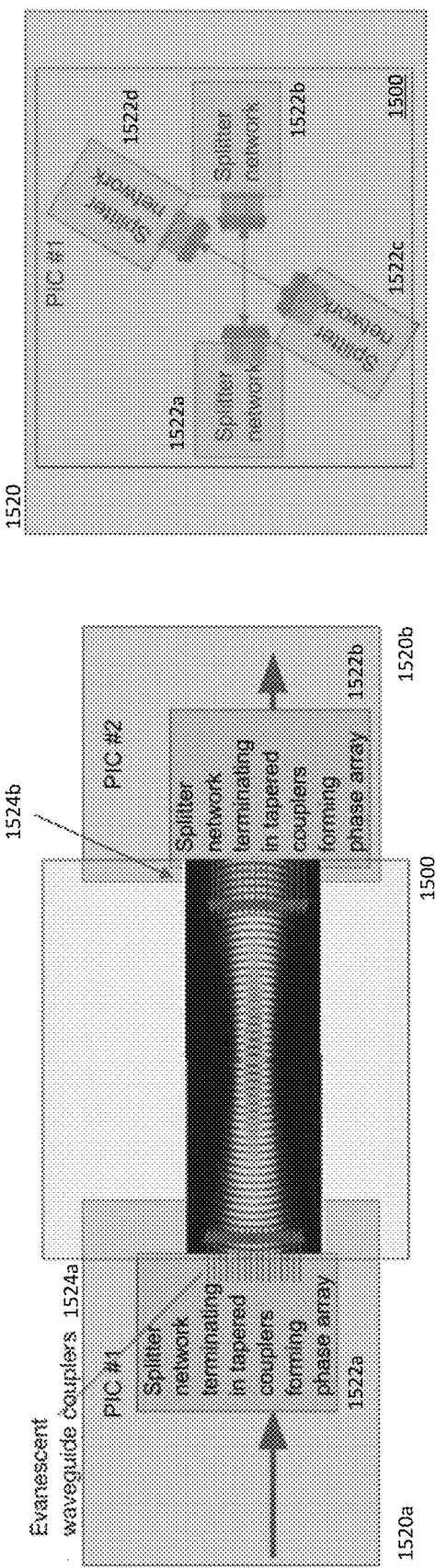
FIG. 15A shows a splitter network terminating in a series of tapered waveguide couplers produce a low numerical aperture (NA) (i.e., large-diameter) beam in a 2D waveguide that comes to a focus and then couples into a second PIC.
FIG. 15B illustrates several splitter networks coupled by overlapping or intersecting 2D waveguides.

FIGS. 15A and 15B show USPICs without 2D Focusing elements. As illustrated in FIG. 15A, a waveguide in a PIC 1520a can be fanned out to an array of tapered waveguides 1522a arranged to emit a focusing wave as in a phased array (considered differently, diverging components of beams are coherently cancelled). These tapered waveguides 1522a are evanescently coupled to a USPIC 1500 with a slab waveguide layer that bridges a connection to tapered waveguides 1522b in another PIC 1520b. In this case, as the focusing is done by the transmitter and receiver, the USPIC 1500 does not need a focusing element (such as parabolic reflector). The same technique can be applied to bridge many optical channels, as illustrated in FIG. 15B.

Beam Propagation Through Group Index Mismatch

FIGS. 16A-16D illustrate how to interconnect PICs 1620a and 6120b using a USPIC 1600 with a closely (e.g., sub-wavelength) spaced array of waveguides 1602. Here, the USPIC acts as a "ribbon cable" that connects the PICs 1620a and 1620b at an arbitrary distance, since beams 1601 are prevented from spreading between waveguides by group velocity mismatch (group index mismatch/lack of phase-matching) among the waveguides 1602. FIG. 16B is a plot of the group index versus transverse position for the waveguides 1602, with each horizontal line segment representing a different waveguide. The vertical offsets indicate the group index (and hence group velocity) mismatches. The beams 1601 in the USPIC waveguides 1602 couple adiabatically to and/or form waveguides 1622 in each PIC 1620*a*, 1620*b* via elevator coupling (i.e., the waveguides 1602 and 1622 have tapered ends that are overlapped vertically).

This USPIC 1620 has patterned waveguides instead of the 2D waveguide described above. A limitation of this approach is that it does not allow for crossing beams as in the relay 1400 shown in FIG. 14 or slab waveguide USPIC 1500 in FIG. 15. But a benefit of this approach is that arbitrary lengths are possible without intermediate refocusing of the beams as above (e.g., as in FIG. 14). Scalable and low-cost manufacture is still possible by, for example, pulling pre-forms from a polymer ingot in a draw-tower for increased uniformity. In this approach, angular misalignment is still acceptable thanks to the evanescent adiabatic coupling described above.

FIG. 16D shows coupling between waveguides 1602 in the USPIC 1600 and the waveguides 1622 in the first PIC 1622*a* in greater detail. The waveguides 1602, 1622 have different pitches and can tolerate a wide range of angular misalignment, just like the waveguide coupling between the PIC and microchiplet in FIG. 1B. Indeed, an intentional angular offset can actually be beneficial in this approach. Off-axis alignment has at least two benefits. First, the system has improved lateral tolerance when the waveguide intersects the coupler at an angle. Second, off-axis coupling tends to improve angular tolerance. Both of these benefits are described above in greater detail.

Automatic Vertical Alignment

Figures 17A, 17B:
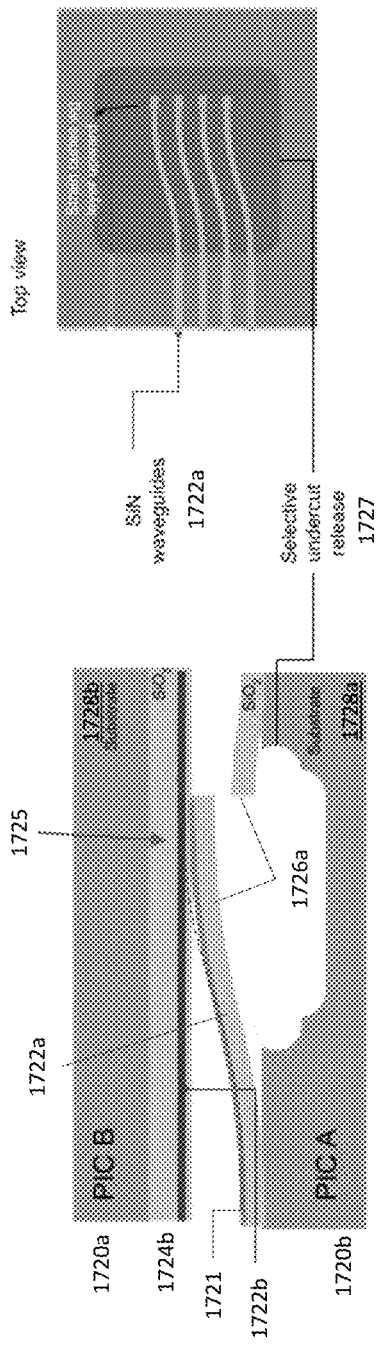
FIGS. 17A and 17B show profile and plan views, respectively, of self-alignment in the out-of-plane (z) dimension by pre-tensioned cantilevers to ensure spring-loaded contact between the two surfaces.

FIGS. 17A and 17B show profile and plan views, respectively, or self-aligning couplers 1724 that provide automatic alignment in three dimensions (3D), i.e., in the transverse plane and in the vertical dimension, between waveguides 1722*a* and 1722*b* in PICs 1720*a* and 1720*b*, respectively. 3D alignment is useful because whereas the in-plane self-alignment works well when the surfaces of the two waveguide-containing materials are flat so that they can be positioned well on top of one another, flatness is not always guaranteed. For example, the two PICs 1720*a* and 1720*b* chips may not be polished well enough, or they may have protrusions, or there may be some contamination between them that prevents surface contact that is close and reliable enough for evanescent mode transfer. Self-alignment in the vertical direction accommodates surface imperfections that could otherwise prevent good surface contact between the PICs 1720*a* and 1720*b*.

In this example, the upper PIC 1720*b* has an array of parallel SiN waveguides 1722*b* formed on an $SiO_2$ cladding layer 1726*b*, which is in turn is on a suitable substrate 1728*b*. Its surface is nominally flat, but could be rippled, curved, or bumpy, e.g., due to manufacturing imperfections or to meet specified design criteria.

The lower PIC 1720*a* also includes an array of SiN waveguides 1722*a* formed on an $SiO_2$ cladding layer 1726*a*, which is in turn is on a suitable substrate 1728*a*. In this case, however, the SiN waveguides 1722*a* are parallel with each other but are formed in a bent or hockey-stick shape when viewed from above (FIG. 17B) like the couplers shown in inset (i) of FIG. 1A. (They can also be straight but angled with respect to the waveguides 1722*b* in the upper PIC 1720*b* like the microchiplet and PIC waveguides in inset (ii) of FIGS. 1A and 1*n* FIG. 1B.)

The bent portions of the waveguides 1722*a* and a portion of the underlying cladding 1726*a* layer form a cantilever 1725 that is released from the substrate 1728*a*. A trench or undercut region 1727 is etched in the substrate 1728*a* underneath the cantilever using an isotropic chemical etch for a selective release like those used in microelectromechanical systems (MEMS) manufacturing. Because the SiN waveguide layer tends to be strained in tension, releasing it curls the oxide membrane up and toward the upper PIC 1720*b* (out of the page in FIG. 17B). A cantilever 1725 that is about 50 μm long and includes 300 nm thick SiN waveguide layer on a 1 μm thick $SiO_2$ layer should reach out of the plane of the lower PIC 1720*a* by about 10-20 μm. As expected for a singly clamped bimorph layer, the out-of-plane displacement grows quadratically with cantilever length, provided the displacement is small enough to keep it from curling up.

FIG. 17A shows the benefit of this cantilever 1725*a* clearly: when the PICs 1720*a* and 1720*b* are stacked on each other, the cantilever 1725 comes to rest spring-loaded against the upper PIC 1720*b*. This creates couplers 1724 between the waveguides 1722*a* in the lower PIC 1720*a* and the waveguides 1722*b* in the upper PIC 1720*b* that provide automatic out-of-plane alignment in addition to the in-plane alignment provided by the transverse angle between the waveguides 1722*a* and 1722*b*. Moreover, the alignment between the waveguides 1722*a* and 1722*b* is resilient to modest translations in all three dimensions (x, y, and z). The same spring-loaded vertical alignment can be used for electrical contacts and for contacts against a self-aligning photonic circuit board (e.g., as in FIG. 1A) or self-aligning ribbon cable (e.g., as in FIGS. 16A-16D). The cantilever 1725 can be singly clamped, as illustrated in FIGS. 17A and 17B, or doubly clamped for stiffer, but smaller, out of plane displacement.

The cantilever 1725 and waveguides 1722*a* and 1722*b* are designed so that the waveguides 1722*a* and 1722*b* overlap, intersect, and/or cross over each other at a single, uniquely shaped region. This intersection is designed (by waveguide width, height, and intersection angle) such that light 1721 propagating in one set of waveguides 1722*a*(*b*) evanescently couples into the other set of waveguides 1722*b*(*a*). The amount of coupling depends on the size and shape of the intersection and can be targeted at 100% transmission between the layers, or some fraction. This coupling technique can be used between PICs, as shown in FIGS. 17A and 17B; between a PIC and a microchiplet; between a PIC and an SAPCB; or between a USPIC (with or without waveguides) and a PIC, SAPCB, or microchiplet. In addition, the waveguides on the cantilever can be bent or straight; if they are straight, the waveguides on the other device (e.g., the second PIC 1720*b* in FIG. 17A) can be bent or angled to provide tolerance to transverse misalignment.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system comprising:
   a first device comprising a first waveguide that guides light in a first direction in a first plane; and
   a second device in contact with the first device and comprising a second waveguide with a coupling section that (i) guides light in a second direction in a second plane parallel to the first plane, the second direction forming an angle of θ with the first direction about an axis perpendicular to the first plane and the second plane, and (ii) overlaps the first waveguide such that at least a portion of the light couples evanescently between the first waveguide and the second waveguide,
   wherein the first waveguide is formed in a polymer layer disposed on a printed circuit board and defines at least one hole for an electrical contact between the printed circuit board and the second device.

2. The system of claim 1, wherein the first waveguide is in a first waveguide array having a first pitch and the second waveguide is in a second waveguide array having a second pitch different than the first pitch.

3. The system of claim 2, wherein the second waveguide array comprises single-mode waveguides having different widths.

4. The system of claim 2, wherein the second pitch is less than L sin θ, where L is a length of the coupling section of the second waveguide.

5. The system of claim 2, wherein a coupling efficiency between the first waveguide and the second waveguide is invariant to longitudinal displacement of the second waveguide with respect to the first waveguide.

6. The system of claim 2, wherein a coupling efficiency between the first waveguide and the second waveguide is invariant to transverse displacement of the second waveguide with respect to the first waveguide less than L sin θ, where L is a length of the coupling section of the second waveguide.

7. The system of claim 2, wherein a coupling efficiency between the first waveguide and the second waveguide is invariant to angular misalignment about the axis perpendicular to the first plane and the second plane over a range of about 2° to about 15°.

8. The system of claim 1, wherein the first waveguide and the coupling section of the second waveguide are separated by about 0.5 μm to about 2.0 μm.

9. The system of claim 1, wherein the first waveguide is in or on a cantilever that is released from a substrate and pushes against a surface of the second device to align the coupling section of the second waveguide to the first waveguide along the axis perpendicular to the first plane and the second plane.

10. The system of claim 1, wherein the first device is a first photonic integrated circuit and the second device is one of a second photonic integrated circuit or a microchiplet.

11. A system comprising:
a photonic circuit board comprising:
  a printed circuit board;
  a polymer layer disposed on the printed circuit board; and
  an array of linear polymer waveguides formed in the polymer layer and configured to guide light in a first direction; and
a photonic integrated circuit disposed on the photonic circuit board and comprising:
  a waveguide crossing a linear polymer waveguide in the array of linear polymer waveguides at an angle of about 2° to about 30° in a plane parallel to the polymer layer at a distance of about 0.5 μm to about 2.0 μm from the linear polymer waveguide.

12. The system of claim 11, wherein the photonic integrated circuit further comprises a substrate and the waveguide is in or on a cantilever that is released from the substrate and pushes against a surface of the polymer layer to align the waveguide to the linear polymer waveguide in a direction roughly perpendicular to polymer layer.

13. A system comprising:
a first device comprising a first waveguide that guides light in a first direction in a first plane; and
a second device in contact with the first device and comprising a second waveguide with a coupling section that (i) guides light in a second direction in a second plane parallel to the first plane, the second direction forming an angle of θ with the first direction about an axis perpendicular to the first plane and the second plane, and (ii) overlaps the first waveguide such that at least a portion of the light couples evanescently between the first waveguide and the second waveguide,
wherein the first waveguide is in a first waveguide array having a first pitch and the second waveguide is in a second waveguide array having a second pitch different than the first pitch and the second waveguide array comprises single-mode waveguides having different widths.

14. The system of claim 13, wherein a coupling efficiency between the first waveguide and the second waveguide is invariant to at least one of:
longitudinal displacement of the second waveguide with respect to the first waveguide,
transverse displacement of the second waveguide with respect to the first waveguide less than L sin θ, where L is a length of the coupling section of the second waveguide, or
angular misalignment about the axis perpendicular to the first plane and the second plane over a range of about 2° to about 15°.

15. The system of claim 13, wherein the first waveguide is in or on a cantilever that is released from a substrate and pushes against a surface of the second device to align the coupling section of the second waveguide to the first waveguide along the axis perpendicular to the first plane and the second plane.

16. The system of claim 13, wherein the first device is a first photonic integrated circuit and the second device is one of a second photonic integrated circuit or a microchiplet.

17. A system of comprising:
a first device comprising a first waveguide that guides light in a first direction in a first plane; and
a second device in contact with the first device and comprising a second waveguide with a coupling section that (i) guides light in a second direction in a second plane parallel to the first plane, the second direction forming an angle of θ with the first direction about an axis perpendicular to the first plane and the second plane, and (ii) overlaps the first waveguide such that at least a portion of the light couples evanescently between the first waveguide and the second waveguide,
wherein the first waveguide is in a first waveguide array having a first pitch and the second waveguide is in a second waveguide array having a second pitch different than the first pitch and the second pitch is less than L sin θ, where L is a length of the coupling section of the second waveguide.

18. The system of claim 17, wherein a coupling efficiency between the first waveguide and the second waveguide is invariant to at least one of:
longitudinal displacement of the second waveguide with respect to the first waveguide;
transverse displacement of the second waveguide with respect to the first waveguide less than L sin θ, where L is a length of the coupling section of the second waveguide; or
angular misalignment about the axis perpendicular to the first plane and the second plane over a range of about 2° to about 15°.

19. The system of claim 17, wherein the first waveguide is in or on a cantilever that is released from a substrate and pushes against a surface of the second device to align the coupling section of the second waveguide to the first waveguide along the axis perpendicular to the first plane and the second plane.

20. The system of claim 17, wherein the first device is a first photonic integrated circuit and the second device is one of a second photonic integrated circuit or a microchiplet.

* * * * *